(12) United States Patent
Segura Cava et al.

(10) Patent No.: US 11,403,149 B2
(45) Date of Patent: Aug. 2, 2022

(54) MANAGEMENT OF A VIRTUAL NETWORK FUNCTION

(71) Applicant: Telefonaktiebolaget LM Ericsson (publ), Stockholm (SE)

(72) Inventors: Gema Segura Cava, Madrid (ES); Ana Cordoba Lefler, EM Prinsenbeek (NL); Alfredo Gonzalez Plaza, Rivas Vaciamadrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 102 days.

(21) Appl. No.: 16/756,486

(22) PCT Filed: Dec. 4, 2017

(86) PCT No.: PCT/EP2017/081346
§ 371 (c)(1),
(2) Date: Apr. 16, 2020

(87) PCT Pub. No.: WO2019/076472
PCT Pub. Date: Apr. 25, 2019

(65) Prior Publication Data
US 2021/0200599 A1    Jul. 1, 2021

(30) Foreign Application Priority Data
Oct. 17, 2017 (EP) .................... 17382693

(51) Int. Cl.
*G06F 9/455* (2018.01)
*G06F 9/50* (2006.01)
(52) U.S. Cl.
CPC ........ *G06F 9/5077* (2013.01); *G06F 9/45558* (2013.01); *G06F 2009/45595* (2013.01)

(58) Field of Classification Search
CPC .................................................. G06F 9/45558
(Continued)

(56) References Cited

U.S. PATENT DOCUMENTS 10,264,020 B1 * 4/2019 Nanda ..................... H04L 63/20
2013/0124712 A1 * 5/2013 Parker ................. H04L 41/5051
709/224

(Continued)

OTHER PUBLICATIONS

Dierks, T., et al., "The TLS Protocol Version 1.0", RFC 2246; Network Working Group; Category: Standards Track, Jan. 1999, pp. 1-29.

(Continued)

*Primary Examiner* — Mehran Kamran
(74) *Attorney, Agent, or Firm* — Murphy, Bilak & Homiller, PLLC

(57) ABSTRACT

There is provided a method of operating a virtual network function manager for management of a virtual network function. A first request to manage a virtual network function is received (404). The request comprises an indication of whether to select an alternative virtual resource for allocation if a requested virtual resource is unavailable for allocation. A second request for a virtual resource associated with the first request to manage the virtual network function is transmitted (406). The requested virtual resource has one or more predefined characteristics. If a response is received that indicates the virtual resource having the one or more predefined characteristics is unavailable for allocation (408), an alternative virtual resource is selected for allocation (412). The alternative virtual resource has one or more alternative characteristics comprising at least one alternative characteristic that is different to a corresponding one of the predefined characteristics.

16 Claims, 9 Drawing Sheets

(58) Field of Classification Search
USPC ............................................................ 718/1
See application file for complete search history.

(56) References Cited

U.S. PATENT DOCUMENTS

| | | | | |
|---|---|---|---|---|
| 2014/0164617 A1* | 6/2014 | Jalan | .................. | H04L 67/12 |
| | | | | 709/226 |
| 2014/0169168 A1* | 6/2014 | Jalan | .................. | H04L 67/1002 |
| | | | | 370/235 |
| 2015/0339302 A1* | 11/2015 | Dwarampudi | ...... | G06F 11/1464 |
| | | | | 707/667 |
| 2016/0103698 A1* | 4/2016 | Yang | .................. | G06F 11/203 |
| | | | | 714/4.11 |
| 2016/0170848 A1* | 6/2016 | Yang | .................. | G06F 11/2023 |
| | | | | 714/4.12 |
| 2016/0182293 A1* | 6/2016 | Di Benedetto | ..... | H04L 12/4675 |
| | | | | 709/221 |
| 2016/0277509 A1* | 9/2016 | Qiang | .................. | H04L 67/16 |
| 2016/0359682 A1 | 12/2016 | Senarath et al. | | |
| 2017/0026462 A1* | 1/2017 | Yin | .................. | H04L 67/16 |
| 2017/0048165 A1 | 2/2017 | Yu et al. | | |
| 2017/0063598 A1* | 3/2017 | Zhu | .................. | H04L 41/20 |
| 2017/0104609 A1* | 4/2017 | Mcnamee | .............. | H04L 63/06 |
| 2017/0141944 A1* | 5/2017 | Lee | .................. | H04L 67/10 |
| 2017/0192811 A1* | 7/2017 | Kiess | .................. | G06F 9/541 |
| 2017/0250870 A1* | 8/2017 | Zhao | .................. | H04L 63/20 |
| 2017/0272523 A1* | 9/2017 | Cillis | .................. | H04L 41/5048 |
| 2017/0279672 A1* | 9/2017 | Krishnan | ............ | G06F 9/45558 |
| 2018/0013656 A1* | 1/2018 | Chen | .................. | H04W 24/04 |
| 2018/0227179 A1* | 8/2018 | Ding | .................. | G06F 9/45558 |
| 2018/0329732 A1* | 11/2018 | Anumalasetty | ..... | H04L 67/1029 |
| 2018/0375726 A1* | 12/2018 | Xia | .................. | H04L 12/46 |
| 2018/0375734 A1* | 12/2018 | Xia | .................. | H04L 41/0246 |
| 2019/0028350 A1* | 1/2019 | Yeung | .................. | H04L 9/0894 |
| 2019/0034216 A1* | 1/2019 | Galvez | .................. | G06F 9/50 |
| 2019/0052548 A1* | 2/2019 | Kojukhov | ............ | H04L 41/5038 |
| 2019/0052574 A1* | 2/2019 | Zhao | .................. | H04L 47/70 |
| 2019/0058636 A1* | 2/2019 | Xia | .................. | G06F 9/5077 |
| 2019/0065278 A1* | 2/2019 | Jeuk | .................. | G06F 9/45558 |
| 2019/0199760 A1* | 6/2019 | Arauz-Rosado | .... | G06F 9/45558 |
| 2019/0288914 A1* | 9/2019 | Celozzi | .................. | H04L 41/0896 |
| 2019/0356728 A1* | 11/2019 | Devilbiss | ............ | H04L 67/1008 |
| 2021/0119866 A1* | 4/2021 | Premnath | ............ | H04L 41/5054 |
| 2021/0149699 A1* | 5/2021 | Celozzi | .................. | G06F 9/45558 |

OTHER PUBLICATIONS

Unknown, Author, "End to End Network Function Virtualization Architecture Instantiation", Intel, Brocade, Cyan, Red Hat, and Telefonica—NFV Services, 2015, pp. 1-8.

Unknown, Author, "Network Functions Virtualisation (NFV); Management and Orchestration; Or-Vnfm reference point—Interface and Information Model Specification", ETSI GS NFV-IFA 007 V2.1.1, Oct. 2016, pp. 1-130.

Unknown, Author, "OpenStack Enhanced Platform Awareness", Intel; OpenStack Enhanced Platform Awareness, 2014, pp. 1-8.

* cited by examiner

MANAGEMENT OF A VIRTUAL NETWORK FUNCTION

TECHNICAL FIELD

The present idea relates to a virtual network function manager and a method for management of a virtual network function.

BACKGROUND

The virtualisation of network functions is transforming the manner in which networks are built and operated. However, in order to effectively virtualise network functions, it is essential that appropriate virtual resources (such as virtual infrastructure resources) are properly allocated to the virtual network functions (VNFs). For example, beneficial services can be provided by way of a virtual network function (VNF) if optimum performance, scalability, and predictability can be assured. As such, the appropriate management of virtual network functions (VNFs) through the allocation of appropriate resources that are available when deploying applications in a virtualised environment is important.

There exist systems that are operable to manage virtual network functions (VNFs). However, a problem currently arises in existing systems, where the inputs into those systems that indicate the resources that are to be allocated may be inaccurate or even obsolete. As such, existing systems may base decisions on inaccurate or obsolete information. For example, it is assumed in existing systems that all the knowledge and intelligence required to take a correct decision is always available. However, the dynamic nature of a virtualisation environment means that this is not always the case and there are certain circumstances where a decision might not be based on accurate information.

For example, a decision may be taken based on inaccurate information if a required resource has not yet been booked at the point at which a resource capacity to instantiate a virtual network function (VNF) is read. This situation can lead to a race condition. Another example is where a resource change notification is received immediately following a read of a capacity to instantiate a virtual network function (VNF) and an initiation of request to manage the virtual network function (VNF), since there may not be adequate time for the resource change notification to be taken into account. This can result in an error when resources are requested. Also, due to the dynamic nature of virtualisation environments, certain resources that are requested may be unavailable for allocation, which can often lead to unsuccessful or failed operations in existing systems. These unsuccessful or failed operations, in turn, can result in a loss of service during certain time periods and/or a need to retry the same request for resource allocation at a later time. This negatively impacts the efficiency in the operations of the existing systems.

As such, existing systems are unable to effectively manage dynamic virtual network functions (VNFs) that are continuously changing. There is thus a need for an improved means for managing a virtual network function, which overcomes at least some of the problems associated with existing systems.

SUMMARY

It is an object to obviate or eliminate at least some of the above disadvantages associated with existing systems and provide an improved means for managing a virtual network function.

Therefore, according to an aspect of the idea, there is provided a method of operating a virtual network function manager for management of a virtual network function. The method comprises receiving a first request to manage a virtual network function. The first request comprises an indication of whether to select an alternative virtual resource for allocation if a requested virtual resource is unavailable for allocation. The method also comprises transmitting a second request for a virtual resource associated with the first request to manage the virtual network function. The requested virtual resource has one or more predefined characteristics. The method also comprises selecting an alternative virtual resource for allocation, if a response is received that indicates the virtual resource having the one or more predefined characteristics is unavailable for allocation. The alternative virtual resource has one or more alternative characteristics comprising at least one alternative characteristic that is different to a corresponding one of the predefined characteristics.

The idea thus provides an improved mechanism for managing a virtual network function. The mechanism enables the execution of operations to manage a virtual network function with more flexibility. This is possible since more information is available to the virtual network function manager in the request to manage the virtual network function. The additional information provided in the request to manage the virtual network function comprises an indication of whether to select an alternative virtual resource for allocation if a requested virtual resource is unavailable for allocation, which moves the management away from a strict usage of current characteristics for a requested virtual resource. This provides greater flexibility in the management of virtual network functions.

The improved mechanism advantageously maximises the chances for requests to manage virtual network functions to be completed successfully, even where there is a resource shortage. In particular, the mechanism prevents unsuccessful or failed operations since, when a requested resource is unavailable for allocation, it is possible to retry the allocation with other resources that may actually be available through the selection of an alternative virtual resource for allocation. By reducing or even preventing unsuccessful or failed operations, service degradation is minimised, loss of service is prevented, and downtimes are avoided. As such, the efficiency of operations to manage a virtual network function is improved.

In some embodiments, the one or more predefined characteristics may comprise any one or more of a predefined parameter defining an infrastructure of a virtualisation environment and a predefined instantiation level defining a level at which software instances are created in the virtualisation environment.

In some embodiments, the one or more predefined characteristics may comprise the predefined parameter and the predefined instantiation level and the one or more alternative characteristics may comprise a parameter that is the same as the predefined parameter and an instantiation level that is different to the predefined instantiation level, a parameter that is different to the predefined parameter and an instantiation level that is the same as the predefined instantiation level, or a parameter that is different to the predefined parameter and an instantiation level that is different to the predefined instantiation level. This can advantageously enable an operator to control which alternative resources to use.

In some embodiments, the selection of the alternative virtual resource for allocation may be based on any one or more of an indication of one or more alternative characteristics in the received first request to manage a virtual network function, an indication of one or more alternative characteristics in a virtual network function descriptor, and one or more policies associated with one or more alternative characteristics. This provides the means to fine tune the management of the virtual network function. For example, policies can provide both a mechanism to dynamically select the optimum alternative virtual resource and the flexibility to modify the selection to better adapt to different circumstances. The use of policies can also provide an operator with a high degree of flexibility in the control on the selection of alternative resources.

In some embodiments, the one or more policies may result in a priority assigned to one or more alternative characteristics. In this way, an alternative virtual resource having the most optimum characteristics can be selected. Also, the priorities can, for example, provide an easy way in which to handle alternatives in an ordered list.

In some embodiments, the selection of the alternative virtual resource for allocation may be based on the one or more policies if an indication of one or more alternative characteristics is absent in one or more of the received first request to manage a virtual network function and the virtual network function descriptor. As mentioned earlier, the use of policies provides the means to fine tune the management of the virtual network function. For example, policies can provide both a mechanism to dynamically select the optimum alternative virtual resource and the flexibility to modify the selection to better adapt to different circumstances. The use of policies can also provide an operator with a high degree of flexibility in the control on the selection of alternative resources.

In some embodiments, if the selected alternative virtual resource is unavailable for allocation, the method may comprise selecting a further alternative virtual resource having one or more further alternative characteristics comprising at least one further alternative characteristic that is different to a corresponding one of the alternative characteristics. In this way, unsuccessful or failed operations are reduced such that service degradation is minimised, loss of service is prevented, and downtimes are avoided to thereby improve the efficiency of operations to manage a virtual network function.

In some embodiments, if the selected further alternative virtual resource is unavailable for allocation, the method may comprise continuing to select further alternative virtual resources for allocation until a selected further alternative virtual resource is available for allocation or continuing to select further alternative virtual resources for allocation until a maximum value of selections is reached. In this way, unsuccessful or failed operations are reduced even further or even eliminated such that service degradation is minimised, loss of service is prevented, and downtimes are avoided to thereby improve the efficiency of operations to manage a virtual network function.

According to another aspect of the idea, a virtual network function manager arranged to manage a virtual network function is provided. The virtual network function manager comprises processing circuitry configured to receive a first request to manage a virtual network function. The first request comprises an indication of whether to select an alternative virtual resource for allocation if a requested virtual resource is unavailable for allocation. The processing circuitry is also configured to transmit a second request for a virtual resource associated with the first request to manage the virtual network function. The requested virtual resource has one or more predefined characteristics. The processing circuitry is also configured to select an alternative virtual resource for allocation, if a response is received that indicates the virtual resource having the one or more predefined characteristics is unavailable for allocation. The alternative virtual resource has one or more alternative characteristics comprising at least one alternative characteristic that is different to a corresponding one of the predefined characteristics. The idea thus provides the advantages discussed earlier in respect of the method of operating a virtual network function manager for management of a virtual network function.

In some embodiments, the one or more predefined characteristics may comprise any one or more of a predefined parameter defining an infrastructure of a virtualisation environment and a predefined instantiation level defining a level at which software instances are created in the virtualisation environment.

In some embodiments, the one or more predefined characteristics may comprise the predefined parameter and the predefined instantiation level. In some of these embodiments, the one or more alternative characteristics may comprise a parameter that is the same as the predefined parameter and an instantiation level that is different to the predefined instantiation level, a parameter that is different to the predefined parameter and an instantiation level that is the same as the predefined instantiation level, or a parameter that is different to the predefined parameter and an instantiation level that is different to the predefined instantiation level. This can advantageously enable an operator to control which alternative resources to use.

In some embodiments, the processing circuitry may be configured to select the alternative virtual resource for allocation based on any one or more of an indication of one or more alternative characteristics in the received first request to manage a virtual network function, an indication of one or more alternative characteristics in a virtual network function descriptor, and one or more policies associated with one or more alternative characteristics. This provides the means to fine tune the management of the virtual network function. For example, policies can provide both a mechanism to dynamically select the optimum alternative virtual resource and the flexibility to modify the selection to better adapt to different circumstances. The use of policies can also provide an operator with a high degree of flexibility in the control on the selection of alternative resources.

In some embodiments, if the selected alternative virtual resource is unavailable for allocation, the processing circuitry may be configured to select a further alternative virtual resource having one or more further alternative characteristics comprising at least one further alternative characteristic that is different to a corresponding one of the alternative characteristics. In this way, unsuccessful or failed operations are reduced such that service degradation is minimised, loss of service is prevented, and downtimes are avoided to thereby improve the efficiency of operations to manage a virtual network function.

In some embodiments, if the selected further alternative virtual resource is unavailable for allocation, the processing circuitry may be configured to continue to select further alternative virtual resources for allocation until a selected further alternative virtual resource is available for allocation or continue to select further alternative virtual resources for allocation until a maximum value of selections is reached. In this way, unsuccessful or failed operations are reduced even further or even eliminated such that service degradation is minimised, loss of service is prevented, and downtimes are avoided to thereby improve the efficiency of operations to manage a virtual network function.

According to another aspect of the idea, there is provided a method of operating a network functions virtualisation orchestration for management of a virtual network function. The method comprises transmitting a first request to manage a virtual network function. The first request comprises an indication of whether to select an alternative virtual resource for allocation if a requested virtual resource is unavailable for allocation. The idea thus provides the advantages discussed earlier in respect of the method of operating a virtual network function manager for management of a virtual network function.

In some embodiments, the first request to manage a virtual network function may further comprise an indication of one or more alternative characteristics on which to base the selection of an alternative virtual resource for allocation. The idea thus provides the advantages discussed earlier in respect of the method of operating a virtual network function manager for management of a virtual network function.

According to another aspect of the idea, there is provided a network functions virtualisation orchestration arranged to manage a virtual network function. The network functions virtualisation orchestration comprises processing circuitry configured to transmit a first request to manage a virtual network function. The first request comprises an indication of whether to select an alternative virtual resource for allocation if a requested virtual resource is unavailable for allocation. The idea thus provides the advantages discussed earlier in respect of the method of operating a virtual network function manager for management of a virtual network function.

According to another aspect of the idea, there is provided a virtualisation environment. The virtualisation environment comprises a virtual network function manager comprising processing circuitry configured in the manner described earlier in respect of the virtual network function manager and a network functions virtualisation orchestration comprising processing circuitry configured in the manner described earlier in respect of the network functions virtualisation orchestration. The idea thus provides the advantages discussed earlier in respect of the method of operating a virtual network function manager for management of a virtual network function.

In some embodiments, the virtualisation environment may further comprise a virtual infrastructure manager. In these embodiments, the virtual infrastructure manager may comprise processing circuitry configured to transmit the response that indicates the virtual resource having the one or more predefined characteristics is unavailable for allocation.

According to another aspect of the idea, there is provided a computer program product comprising a carrier containing instructions for causing processing circuitry to perform a method as described earlier. The idea thus provides the advantages discussed earlier in respect of the method of operating a virtual network function manager for management of a virtual network function.

Therefore, an improved means for managing a virtual network function is provided.

BRIEF DESCRIPTION OF THE DRAWINGS

For a better understanding of the idea, and to show how it may be put into effect, reference will now be made, by way of example, to the accompanying drawings, in which.

DETAILED DESCRIPTION

Figure 1A:
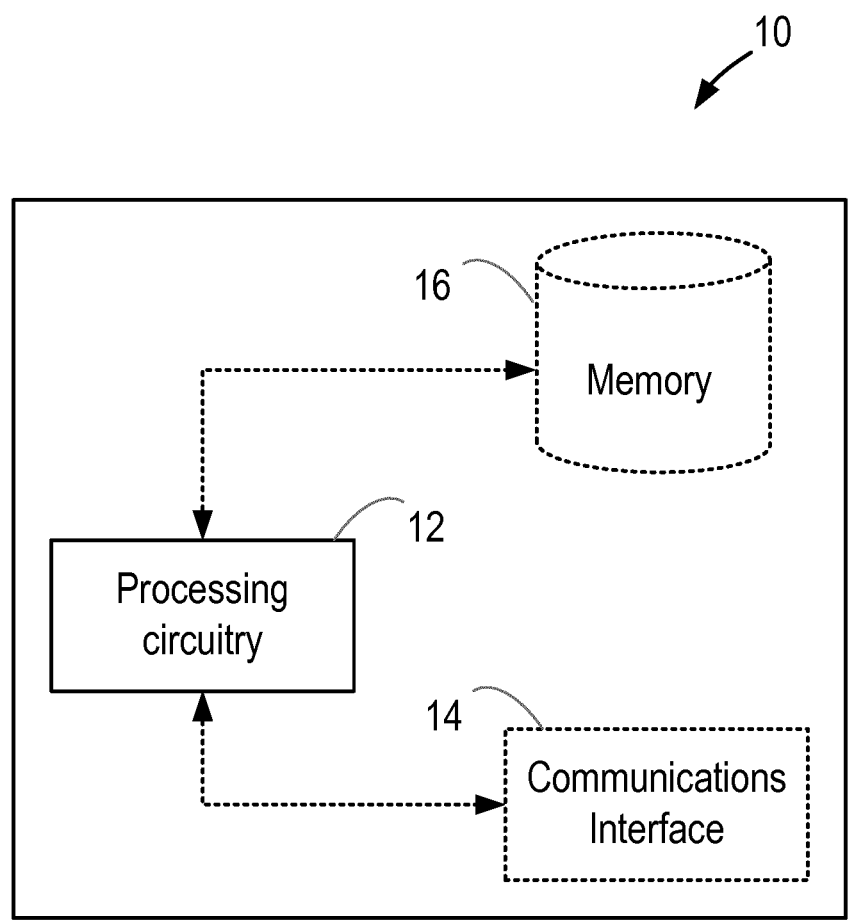
FIG. 1A is a block diagram illustrating a network functions virtualisation orchestration (NFVO) in accordance with an embodiment.

FIG. 1A illustrates a network functions virtualisation orchestration (NFVO) 10 in accordance with an embodiment. The network functions virtualisation orchestration (NFVO) 10 is arranged to manage or handle a virtual network function (VNF). A virtual network function (VNF) referred to herein can be any implementation of a network function (NF) that can be deployed using software virtualisation techniques. A network function (NF) can be any functional building block within a network infrastructure. A functional building block may, for example, be a block within a network infrastructure that has well-defined external interfaces and a well-defined functional behaviour. In practical terms, a network function (NF) may, for example, be a network node, a physical appliance, or any other type of network function.

As illustrated in FIG. 1A, the network functions virtualisation orchestration (NFVO) 10 comprises processing circuitry (or logic) 12. The processing circuitry 12 controls the operation of the network functions virtualisation orchestration (NFVO) 10 and can implement the method described herein in relation to the network functions virtualisation orchestration (NFVO) 10. The processing circuitry 12 can comprise one or more processors, processing units, multi-core processors or modules that are configured or programmed to control the network functions virtualisation orchestration (NFVO) 10 in the manner described herein. In particular implementations, the processing circuitry 12 can comprise a plurality of software and/or hardware modules that are each configured to perform, or are for performing, individual or multiple steps of the method described herein in relation to the network functions virtualisation orchestration (NFVO) 10.

Briefly, the processing circuitry 12 of the network functions virtualisation orchestration (NFVO) 10 is configured to transmit a first request to manage (or handle) a virtual network function (VNF). The first request comprises an indication of whether to select an alternative virtual resource for allocation if a requested virtual resource is unavailable for allocation. In some embodiments, the first request to manage the virtual network function (VNF) may further comprise an indication of one or more alternative characteristics on which to base the selection of an alternative virtual resource for allocation. In some embodiments, the first request to manage a virtual network function (VNF) can be a request to manage a lifecycle of a virtual network function (VNF).

In some embodiments, the network functions virtualisation orchestration (NFVO) 10 may optionally comprise a communications interface 14. The communications interface 14 of the network functions virtualisation orchestration (NFVO) 10 can be for use in communicating with other nodes, such as other virtual nodes. For example, the communications interface 14 of the network functions virtualisation orchestration (NVFO) 10 can be configured to transmit to and/or receive from other nodes requests, resources, information, data, signals, or similar. The processing circuitry 12 of the network functions virtualisation orchestration (NFVO) 10 may be configured to control the communications interface 14 of the network functions virtualisation orchestration (NFVO) 10 to transmit to and/or receive from other nodes requests, resources, information, data, signals, or similar.

Optionally, the network functions virtualisation orchestration (NFVO) 10 may comprise a memory 16. In some embodiments, the memory 16 of the network functions virtualisation orchestration (NFVO) 10 can be configured to store program code that can be executed by the processing circuitry 12 of the network functions virtualisation orchestration (NFVO) 10 to perform the method described herein in relation to the network functions virtualisation orchestration (NFVO) 10. Alternatively or in addition, the memory 16 of the network functions virtualisation orchestration (NFVO) 10, can be configured to store any requests, resources, information, data, signals, or similar that are described herein. The processing circuitry 12 of the network functions virtualisation orchestration (NFVO) 10 may be configured to control the memory 16 of the network functions virtualisation orchestration (NFVO) 10 to store any requests, resources, information, data, signals, or similar that are described herein.

It will be appreciated that FIG. 1A only shows the components required to illustrate this aspect of the network functions virtualisation orchestration (NFVO) 10 and, in a practical implementation, the network functions virtualisation orchestration (NFVO) 10 may comprise additional or alternative components to those shown.

Figure 1B:
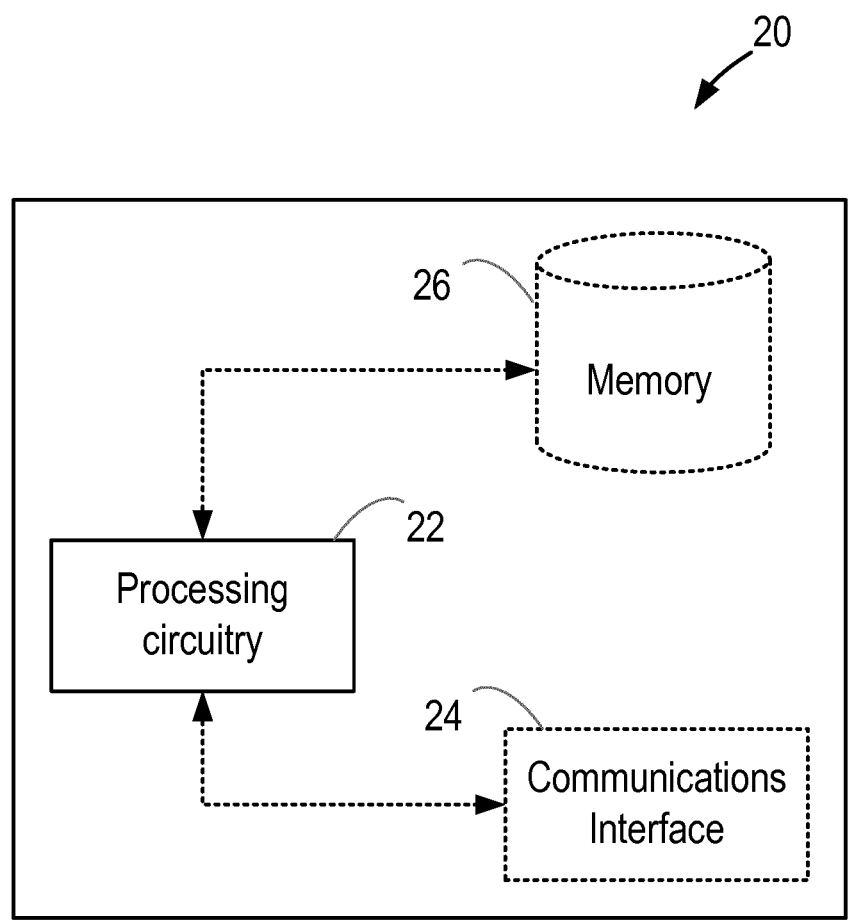
FIG. 1B is a block diagram illustrating a virtual network function manager (VNFM) in accordance with an embodiment.

FIG. 1B illustrates a virtual network function manager (VNFM) 20 in accordance with an embodiment. The virtual network function manager (VNFM) 20 is arranged to manage or handle a virtual network function (VNF). As mentioned earlier, a virtual network function (VNF) referred to herein can be any implementation of a network function (NF) that can be deployed using software virtualisation techniques. A network function (NF) can be any functional building block within a network infrastructure. A functional building block may, for example, be a block within a network infrastructure that has well-defined external interfaces and a well-defined functional behaviour. In practical terms, a network function (NF) may, for example, be a network node, a physical appliance, or any other type of network function.

As illustrated in FIG. 1B, the virtual network function manager (VNFM) 20 comprises processing circuitry (or logic) 22. The processing circuitry 22 controls the operation of the virtual network function manager (VNFM) 20 and can implement the method described herein in relation to the virtual network function manager (VNFM) 20. The processing circuitry 22 can comprise one or more processors, processing units, multi-core processors or modules that are configured or programmed to control the virtual network function manager (VNFM) 20 in the manner described herein. In particular implementations, the processing circuitry 22 can comprise a plurality of software and/or hardware modules that are each configured to perform, or are for performing, individual or multiple steps of the method described herein in relation to the virtual network function manager (VNFM) 20.

Briefly, the processing circuitry 22 of the virtual network function manager (VNFM) 20 is configured to receive a first request to manage (or handle) a virtual network function (VNF). The first request comprises an indication of whether to select an alternative virtual resource for allocation if a requested virtual resource is unavailable for allocation. Thus, the first request to manage a virtual network function (VNF) that the processing circuitry 12 of the network functions virtualisation orchestration (NFVO) 10 is configured to transmit is the first request to manage a virtual network function (VNF) that the processing circuitry 22 of the virtual network function manager (VNFM) 20 is configured to receive. In some embodiments, the first request to manage the virtual network function (VNF) may further comprise an indication of one or more alternative characteristics on which to base the selection of an alternative virtual resource for allocation. In some embodiments, the first request to manage a virtual network function (VNF) can be a request to manage a lifecycle of a virtual network function (VNF).

The processing circuitry 22 of the virtual network function manager (VNFM) 20 is further configured to transmit a second request for a virtual resource associated with the first request to manage the virtual network function. The requested virtual resource has one or more predefined characteristics. The processing circuitry 22 of the virtual network function manager (VNFM) 20 is also configured to select an alternative virtual resource for allocation, if a response is received that indicates the virtual resource having the one or more predefined characteristics is unavailable for allocation. The alternative virtual resource has one or more alternative characteristics comprising at least one alternative characteristic that is different to a corresponding one of the predefined characteristics.

In some embodiments, the processing circuitry 22 of the virtual network function manager (VNFM) 20 may be configured to select the alternative virtual resource for allocation based on any one or more of an indication of one or more alternative characteristics in the received first request to manage a virtual network function (VNF), an indication of one or more alternative characteristics in a virtual network function descriptor (VNFD), and one or more policies associated with one or more alternative characteristics. In some embodiments, the one or more policies may result in a priority assigned to one or more alternative characteristics. The one or more policies may be selected by an operator and/or according to one or more policy rules. For example, in some embodiments, one or more policies may be preconfigured at the virtual network function manager (VNFM) 20 so that the operator can decide on one or more policies for use in the selection of the alternative virtual resource for allocation. According to some embodiments, the processing circuitry 22 of the virtual network function manager (VNFM) 20 may be configured to select the alternative virtual resource for allocation based on the one or more policies if an indication of one or more alternative characteristics is absent in one or more of the received first request to manage a virtual network function (VNF) and the virtual network function descriptor (VNFD).

In some embodiments, the processing circuitry 22 of the virtual network function manager (VNFM) 20 may be configured to transmit a third request for the selected alternative virtual resource. More specifically, the processing circuitry 22 of the virtual network function manager (VNFM) 20 may be configured to transmit the third request for the selected alternative virtual resource to, for example, a virtual infrastructure manager (VIM) 30. The processing circuitry 22 of the virtual network function manager (VNFM) 20 can be configured to receive a response that indicates whether the selected alternative virtual resource is available for allocation, for example, from the virtual infrastructure manager (VIM) 30. If the response that is received indicates the selected alternative virtual resource is available for allocation, the processing circuitry 22 of the virtual network function manager (VNFM) 20 may be configured to allocate the selected alternative virtual resource.

On the other hand, if the selected alternative virtual resource is unavailable for allocation, the processing circuitry 22 of the virtual network function manager (VNFM) 20 can be configured to select a further alternative virtual resource having one or more further alternative characteristics comprising at least one further alternative characteristic that is different to a corresponding one of the alternative characteristics. In some of these embodiments, if the selected further alternative virtual resource is unavailable for allocation, the processing circuitry 22 of the virtual network function manager (VNFM) 20 may be configured to continue to select further alternative virtual resources for allocation in the manner described earlier until a selected further alternative virtual resource is available for allocation. In other embodiments, the processing circuitry 22 of the virtual network function manager (VNFM) 20 may be configured to continue to select further alternative virtual resources in the manner described earlier for allocation until a maximum value of selections is reached.

As illustrated in FIG. 1B, according to some embodiments, the virtual network function manager (VNFM) 20 may optionally comprise a communications interface 24. The communications interface 24 of the virtual network function manager (VNFM) 20 can be for use in communicating with other nodes, such as other virtual nodes. For example, the communications interface 24 of the virtual network function manager (VNFM) 20 can be configured to transmit to and/or receive from other nodes requests, resources, information, data, signals, or similar. The processing circuitry 22 of the virtual network function manager (VNFM) 20 may be configured to control the communications interface 24 of the virtual network function manager (VNFM) 20 to transmit to and/or receive from other nodes requests, resources, information, data, signals, or similar.

Optionally, the virtual network function manager (VNFM) 20 may comprise a memory 26. In some embodiments, the memory 26 the virtual network function manager (VNFM) 20 can be configured to store program code that can be executed by the processing circuitry 22 the virtual network function manager (VNFM) 20 to perform the method described herein in relation to the virtual network function manager (VNFM) 20. Alternatively or in addition, the memory 26 of the virtual network function manager (VNFM) 20, can be configured to store any requests, resources, information, data, signals, or similar that are described herein. The processing circuitry 22 of the virtual network function manager (VNFM) 20 may be configured to control the memory 26 of the virtual network function manager (VNFM) 20 to store any requests, resources, information, data, signals, or similar that are described herein.

It will be appreciated that FIG. 1B only shows the components required to illustrate this aspect of the virtual network function manager (VNFM) 20 and, in a practical implementation, the virtual network function manager (VNFM) 20 may comprise additional or alternative components to those shown.

Figure 2:
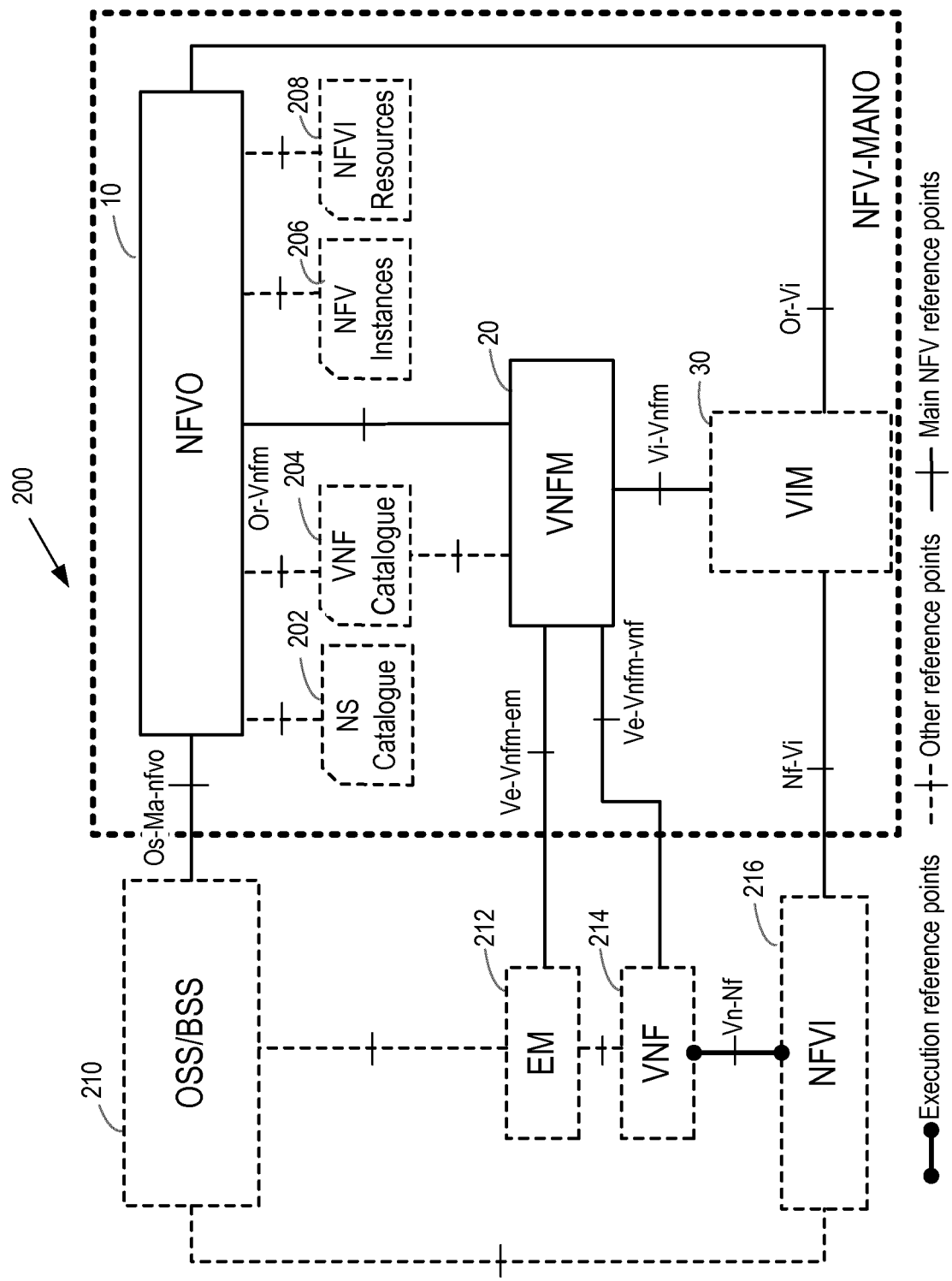
FIG. 2 is a block diagram illustrating a virtualisation environment in accordance with an embodiment.

FIG. 2 is a block diagram illustrating a virtualisation environment 200 in accordance with an embodiment. The virtualisation environment 200 comprises a network functions virtualisation orchestration (NFVO) 10 comprising processing circuitry 12 configured in the manner described earlier with reference to FIG. 1A. The virtualisation environment 200 also comprises a virtual network function manager (VNFM) 20 comprising processing circuitry 22 configured in the manner described earlier with reference to FIG. 1B. The network functions virtualisation orchestration 10 and the virtual network function manager 20 are arranged to manage a virtual network function (VNF) 214.

According to some embodiments, the virtualisation environment 200 can also comprise a virtual infrastructure manager (VIM) 30. In these embodiments, the processing circuitry 22 of the virtual network function manager (VNFM) 20 can be configured to transmit the second request for a virtual resource having the one or more predefined characteristics to the virtual infrastructure manager (VIM) 30. The virtual infrastructure manager (VIM) 30 comprises processing circuitry, which can thus be configured to transmit the response that indicates the virtual resource having the one or more predefined characteristics is unavailable for allocation. Generally, in a virtualisation environment, a network functions virtualisation orchestration (NFVO) is responsible for the orchestration of resources of a network functions virtualisation infrastructure (NFVI) 216 across multiple virtual infrastructure managers (VIMs) and the management of network services, whereas a virtual network function manager (VNFM) is responsible for the management of virtual network function (VNF) instances. The network functions virtualisation infrastructure (NFVI) 216 can, for example, represent the hardware and software components that build up the environment in which virtual network function (VNFs) are deployed.

As illustrated in the embodiment of FIG. 2, a network functions virtualisation management and orchestration (NFV-MANO) architectural framework for managing and orchestrating virtualised network functions (VNFs) can comprise the network functions virtualisation orchestration (NFVO) 10, the virtual network function manager 20 and optionally the virtual infrastructure manager (VIM) 30.

In some embodiments, the virtualisation environment 200 may comprise any one or more of a network services (NS) catalogue 202, a virtual network function (VNF) catalogue 204, a network function virtualisation (NFV) instance 206 and a network functions virtualisation infrastructure (NFVI) instance 208. A network services (NS) catalogue 202 comprises a repository of on-boarded network services. A catalogue virtual network function (VNF) 204 comprises a repository of on-boarded virtual network function (VNF) packages. A network function virtualisation (NFV) instance 206 comprises a repository that holds information of virtual network function (VNF) instances and network service (NS) instances. A network functions virtualisation infrastructure (NFVI) instance 208 comprises a repository that holds information about available, reserved, or allocated network functions virtualisation infrastructure (NFVI) resources. In some embodiments, the virtualisation environment 200 may comprise one or more operation and business support systems (OSS/BSS) 210. In some embodiments, the virtualisation environment 200 may comprise an element manager (EM) 212. An element manager (EM) 212 can be responsible for a fault, configuration, accounting, performance, security (FCAPS) management functionality for the virtual network function (VNF) 214.

The virtual infrastructure manager (VIM) may produce various interfaces (which may also be referred to as "reference points") between components of the virtualisation environment 200 to allow the exchange of information. The "Or-Vi" interface can, for example, be used for exchanging information between the virtual infrastructure manager (VIM) 30 and the network functions virtualisation orchestration (NFVO) 10. For example, the Or-Vi reference can support various interfaces such as any one or more of an interface for virtualised resources capacity management, an interface for virtualised resources change notification, or any other interface, or any combination of interfaces. An interface for virtualised resources capacity management can, for example, be used to request operations related to capacity and usage reporting. It can also allow retrieval of information about available resources, allocated resources, reserved resources and a total capacity of the resources managed by an instance of the virtual infrastructure manager (VIM) 30, globally, or per resource zone to be used as input to capacity planning, capacity changes, and consequently for operations such as network service planning and so on. A virtualised resources change notification can be used to request subscription to virtualised resources change notifications and to provide such notifications to the network functions virtualisation orchestration (NFVO) 10 so that the network functions virtualisation orchestration (NFVO) is aware of changes in underlying resources produced by maintenance and operation of the network functions virtualisation infrastructure (NFVI) 216, which may, for example, include maintenance of network functions virtualisation infrastructure (NFVI) components, evacuation of physical hosts, addition and removal of physical resources subscribed consumer, and so on.

The "Or-Vnfm" interface can be used for exchanging information between the network functions virtualisation orchestration (NFVO) 10 and the virtual network function manager (VNFM) 20. The information that is supported by the Or-Vnfm reference can, for example, comprise any one or more of: a network functions virtualisation infrastructure (NFVI) resources authorization, validation, reservation, or release for a virtual network function (VNF); a network functions virtualisation infrastructure (NFVI) resources allocation or release request for a virtual network function (VNF); a virtual network function (VNF) instantiation; a virtual network function (VNF) instance query (e.g. retrieve any run-time information); a virtual network function (VNF) instance update (e.g. update configuration); a virtual network function (VNF) instance scaling out/in and up/down, a virtual network function (VNF) instance termination; a virtual network function (VNF) package query; a forwarding of events or other state information about virtual network function (VNF) that may, for example, impact also the network service instance; or any other information, or any combination of information.

Figure 3:
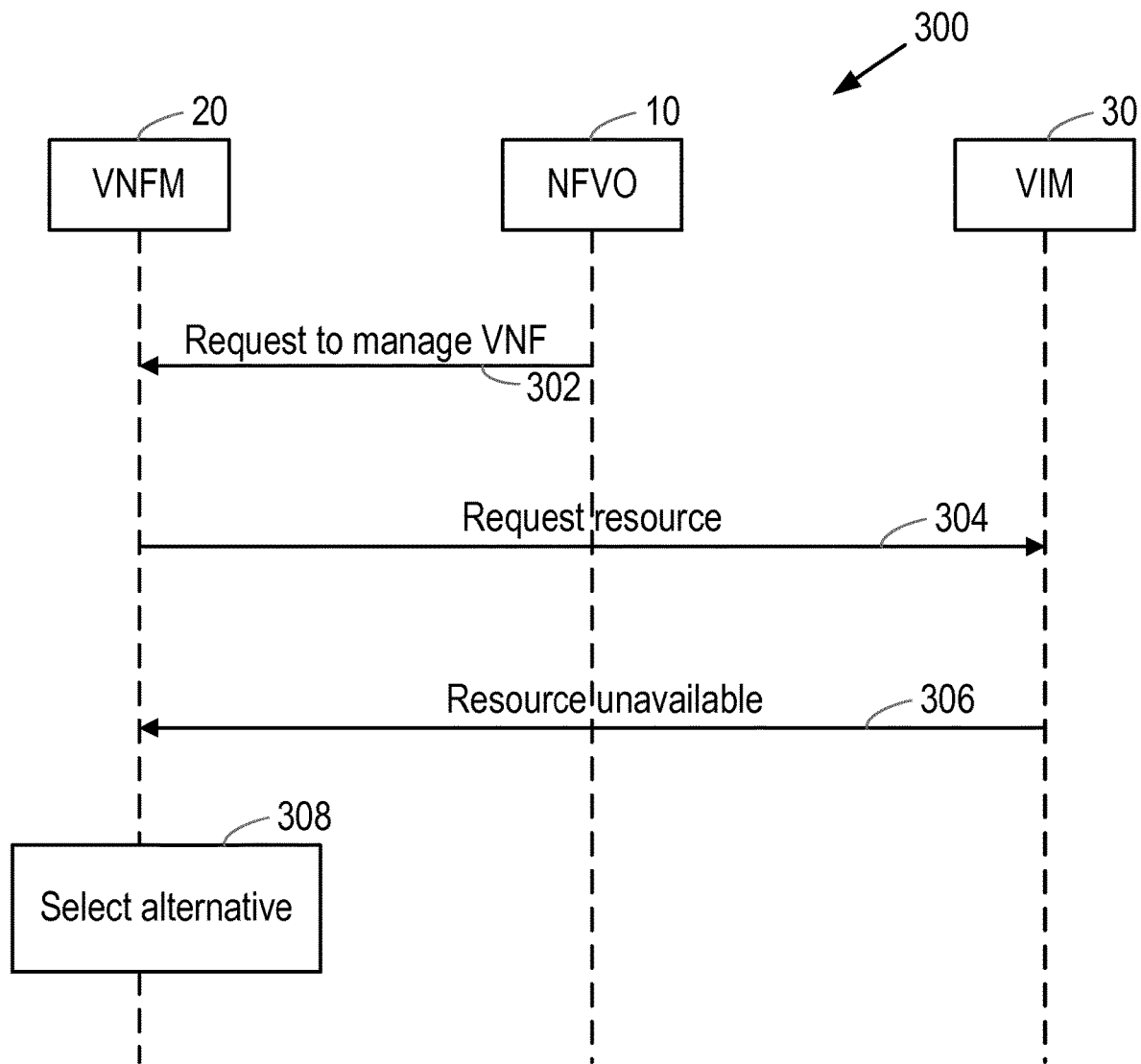
FIG. 3 is a signalling diagram illustrating the signals in a virtualisation environment in accordance with an embodiment.

FIG. 3 is a signalling diagram illustrating the signals in a virtualisation environment 300 in accordance with an embodiment. The visualisation environment 300 according to this embodiment comprises a network functions virtualisation orchestration (NFVO) 10 comprising processing circuitry 12 configured in the manner described earlier with reference to FIG. 1A, a virtual network function manager (VNFM) 20 comprising processing circuitry 22 configured in the manner described earlier with reference to FIG. 1B, and a virtual infrastructure manager (VIM) 30. The network functions virtualisation orchestration (NFVO) 10 and the virtual network function manager (VNFM) 20 are arranged to manage a virtual network function (VNF).

Figure 4:
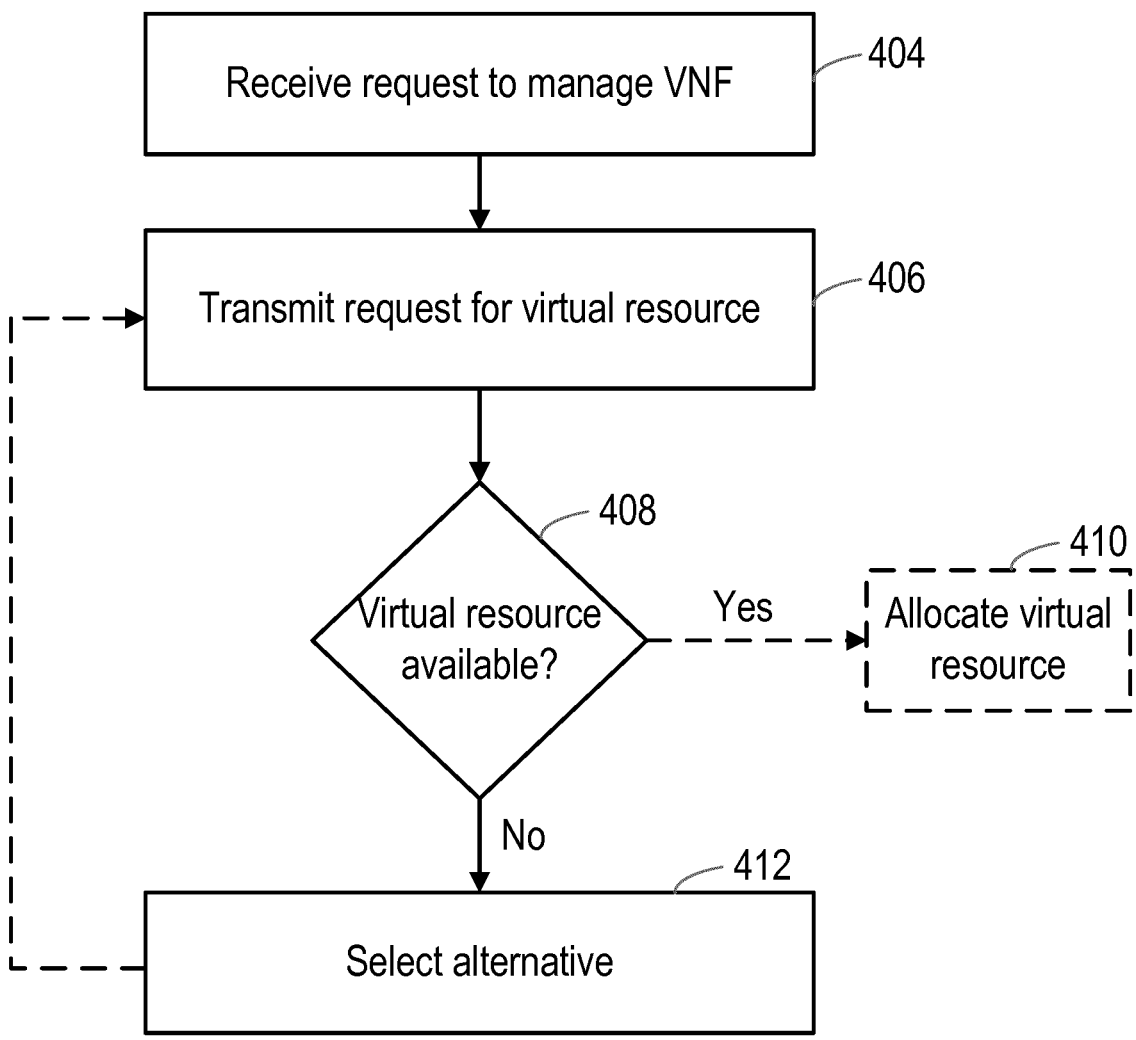
FIG. 4A is a block diagram illustrating a method of operating a network functions virtualisation orchestration (NFVO) in accordance with an embodiment.
FIG. 4B is a block diagram illustrating a method of operating a virtual network function manager (VNFM) in accordance with an embodiment.

FIG. 4A is a block diagram illustrating a method of operating a network functions virtualisation orchestration (NFVO) 10 for management of a virtual network function (VNF) in accordance with the embodiment. The method of FIG. 4A can be performed by or under the control of the processing circuitry 12 of the network functions virtualisation orchestration (NFVO) 10.

FIG. 4B is a block diagram illustrating a method of operating a virtual network function manager (VNFM) 20 for management of a virtual network function (VNF) in accordance with the embodiment. The method of FIG. 4B can be performed by or under the control of the processing circuitry 22 of the virtual network function manager (VNFM) 20.

The method of operating the network functions virtualisation orchestration (NFVO) 10 and the virtual network function manager (VNFM) 20 for management of a virtual network function (VNF) will now be described with reference to FIGS. 3, 4A and 4B.

With reference to FIGS. 3 and 4A, at block 402 of FIG. 4A, a first request 302 to manage a virtual network function (VNF) is transmitted by the network functions virtualisation orchestration (NFVO) 10. More specifically, the first request 302 to manage the virtual network function (VNF) is transmitted from the network functions virtualisation orchestration (NFVO) 10 to the virtual network function manager (VNFM) 20. The first request 302 to manage a virtual network function (VNF) comprises an indication of whether to select an alternative virtual resource for allocation if a requested virtual resource is unavailable for allocation. In some embodiments, the first request 302 to manage the virtual network function (VNF) may further comprise an indication of one or more alternative characteristics on which to base the selection of an alternative virtual resource for allocation.

With reference to FIGS. 3 and 4B, at block 404 of FIG. 4B, the first request 302 to manage the virtual network function (VNF) is received at the virtual network function manager (VNFM) 20. More specifically, the first request 302 to manage the virtual network function (VNF) is received at the virtual network function manager (VNFM) 20 from the network functions virtualisation orchestration (NFVO) 10. As mentioned earlier, the first request 302 to manage a virtual network function (VNF) comprises an indication of whether to select an alternative virtual resource for allocation if a requested virtual resource is unavailable for allocation. As also mentioned earlier, in some embodiments, the first request 302 to manage the virtual network function (VNF) may further comprise an indication of one or more alternative characteristics on which to base the selection of an alternative virtual resource for allocation.

At block 406 of FIG. 4B, a second request 304 for a virtual resource associated with the first request 302 to manage the virtual network function (VNF) is transmitted from the virtual network function manager (VNFM) 20. More specifically, the second request 304 for a virtual resource associated with the first request 302 to manage the virtual network function (VNF) may be transmitted from the virtual network function manager (VNFM) 20 to, for example, a virtual infrastructure manager (VIM) 30. The requested virtual resource has one or more predefined characteristics. A response that indicates whether the virtual resource having the one or more predefined characteristics is available for allocation is received at the virtual network function manager (VNFM) 20. For example, the response 306 that indicates whether the virtual resource having the one or more predefined characteristics is available for allocation may be received at the virtual network function manager (VNFM) 20 from the virtual infrastructure manager (VIM) 30.

At block 408 of FIG. 4B, if a response is received at the virtual network function manager (VNFM) 20 that indicates the virtual resource having the one or more predefined characteristics is available for allocation, the process moves to block 410 of FIG. 4B and the virtual resource is allocated. More specifically, the response that indicates the virtual resource having the one or more predefined characteristics is available for allocation may be received from, for example, the virtual infrastructure manager (VIM) 30. On the other hand, at block 408 of FIG. 4B, if a response 306 is received that indicates the virtual resource having the one or more predefined characteristics is unavailable for allocation, the process moves to block 412 of FIG. 4B (which corresponds to block 308 of FIG. 3) and an alternative virtual resource is selected for allocation. More specifically, the response 306 that indicates the virtual resource having the one or more predefined characteristics is unavailable for allocation may be received from, for example, the virtual infrastructure manager (VIM) 30. The alternative virtual resource has one or more alternative characteristics. The one or more alternative characteristics comprise at least one alternative characteristic that is different to a corresponding one of the predefined characteristics.

In some embodiments, the selection of the alternative virtual resource for allocation can be based on any one or more of an indication of one or more alternative characteristics in the received first request 302 to manage a virtual network function (VNF), an indication of one or more alternative characteristics in a virtual network function descriptor (VNFD), and one or more policies associated with one or more alternative characteristics. In some embodiments, the one or more policies may result in a priority assigned to one or more alternative characteristics. The one or more policies may be selected by an operator and/or according to one or more policy rules. For example, in some embodiments, one or more policies may be preconfigured at the virtual network function manager (VNFM) 20 so that the operator can decide on one or more policies for use in the selection of the alternative virtual resource for allocation. According to some embodiments, the selection of the alternative virtual resource for allocation may be based on the one or more policies if an indication of one or more alternative characteristics is absent in one or more of the received first request 302 to manage a virtual network function (VNF) and the virtual network function descriptor (VNFD).

As illustrated in FIG. 4B, in some embodiments, a third request for the selected alternative virtual resource may be transmitted from the virtual network function manager (VNFM) 20. More specifically, the third request for the selected alternative virtual resource may be transmitted from the virtual network function manager (VNFM) 20 to, for example, a virtual infrastructure manager (VIM) 30. A response that indicates whether the selected alternative virtual resource is available for allocation is received at the virtual network function manager (VNFM) 20, for example, from the virtual infrastructure manager (VIM) 30. If the response that is received at the virtual network function manager (VNFM) 20 indicates the selected alternative virtual resource is available for allocation, the selected alternative virtual resource can be allocated.

On the other hand, if the selected alternative virtual resource is unavailable for allocation, a further alternative virtual resource may be selected, where the further alternative virtual resource has one or more further alternative characteristics comprising at least one further alternative characteristic that is different to a corresponding one of the alternative characteristics. In some of these embodiments, if the selected further alternative virtual resource is unavailable for allocation, the method illustrated in FIG. 4B may comprise continuing to select further alternative virtual resources for allocation in the manner described earlier until a selected further alternative virtual resource is available for allocation. In other embodiments, the method illustrated in FIG. 4B may comprise continuing to select further alternative virtual resources for allocation in the manner described earlier until a maximum value of selections is reached.

The first request 302 to manage the virtual network function (VNF) referred to herein can be any type of request that involves management of the virtual network function (VNF). In some embodiments, for example, the first request 302 to manage the virtual network function (VNF) may specify one or more operations associated with management of the virtual network function (VNF). For example, the first request 302 to manage the virtual network function (VNF) can specify any one or more of an operation associated with instantiating a deployment flavour of the virtual network function (VNF), which may be referred to as an "InstantiateVnfRequest", an operation associated with scaling an instantiated virtual network function (VNF) of a deployment flavour to a target size, which may be referred to as a "ScaleVnfToLevelRequest", an operation associated with changes to the deployment flavour of a virtual network function (VNF), which may be referred to as a "ChangeVnfFlavourRequest", or any other operation associated with management of virtual network function (VNF), or any combination of operations associated with management of virtual network function (VNF).

The one or more "predefined characteristics" referred to herein can, for example, comprise any one or more of a predefined parameter defining an infrastructure of a virtualisation environment (or identifying a deployment flavour, in which case the parameter may be denoted by "FlavourID"), a predefined instantiation level defining a level at which software instances are created in the virtualisation environment (or identifying of an instantiation level, in which case the parameter may be denoted by "InstantiationLevelID"), or any other predefined characteristic, or any combination of predefined characteristics. Examples of a predefined parameter defining an infrastructure of a virtualisation environment include, but are not limited to, a predefined parameter that defines any one or more of a quantity of virtual machines for the virtualisation environment, a quantity of compute resources for the virtualisation environment, a quantity of network resources for the virtualisation environment, a quantity of storage resources for the virtualisation environment, or any other predefined parameter defining an infrastructure of a virtualisation environment, or any combination of predefined parameter defining an infrastructure of a virtualisation environment.

The one or more "alternative characteristics" referred to herein can, for example, comprise any one or more of an alternative parameter defining an infrastructure of a virtualisation environment (or identifying an alternative deployment flavour, in which case the parameter may be denoted by "FlavourIDAlternative"), an alternative instantiation level defining a level at which software instances are created in the virtualisation environment (or identifying of an alternative instantiation level, in which case the parameter may be denoted by "InstantiationLevelIDAlternative"), or any other alternative characteristic, or any combination of alternative characteristics. Examples of an alternative parameter defining an infrastructure of a virtualisation environment include, but are not limited to, an alternative parameter that defines any one or more of a quantity of virtual machines for the virtualisation environment, a quantity of compute resources for the virtualisation environment, a quantity of network resources for the virtualisation environment, a quantity of storage resources for the virtualisation environment, or any other alternative parameter defining an infrastructure of a virtualisation environment, or any combination of alternative parameter defining an infrastructure of a virtualisation environment.

As mentioned earlier, the one or more alternative characteristics referred to herein comprise at least one alternative characteristic that is different to a corresponding one of the predefined characteristics. A "corresponding" one of the predefined characteristic refers to a predefined characteristic that is of the same type of characteristic as the alternative characteristic. For example, in an embodiment where the predefined characteristic comprises a predefined parameter that defines a first quantity of virtual machines for a virtualisation environment, the one or more alternative characteristics may comprise an alternative characteristic comprising a predefined parameter that defines a second quantity of virtual machines for the virtualisation environment. In this example embodiment, the second quantity of virtual machines may be different to the first quantity of virtual machines.

In some embodiments, where the one or more predefined characteristics comprise the predefined parameter and the predefined instantiation level, the one or more alternative characteristics may comprise a parameter that is the same as the predefined parameter and an instantiation level that is different to the predefined instantiation level. In other embodiments, where the one or more predefined characteristics comprise the predefined parameter and the predefined instantiation level, the one or more alternative characteristics may comprise a parameter that is different to the predefined parameter and an instantiation level that is the same as the predefined instantiation level. In yet other embodiments, where the one or more predefined characteristics comprise the predefined parameter and the predefined instantiation level, the one or more alternative characteristics may comprise a parameter that is different to the predefined parameter and an instantiation level that is different to the predefined instantiation level.

Thus, changes are implied in the use of the one or more predefined characteristics. For example, changes may be implied in the use of FlavourID and InstantiationLevelID and optionally also the relationship between these predefined characteristics. More specifically, beyond the original predefined characteristics of the virtual resources associated with the first request 302 to manage the virtual network function (VNF), new information may be added to the first request 302 to manage the virtual network function (VNF) and this new information can be considered by the virtual network function manager (VNFM) 20. The new information can comprise the indication of whether to select an alternative virtual resource for allocation if a requested virtual resource is unavailable for allocation and, in some embodiments, also the indication of one or more alternative characteristics on which to base the selection of an alternative virtual resource for allocation.

In this way, new alternative virtual resources having one or more alternative characteristics can be considered to successfully execute the first request 302 to manage the virtual network function (VNF) or, for example, one or more operations specified in the first request 302 to manage the virtual network function (VNF), if it is not possible to achieve the originally requested virtual resource having the one or more predefined characteristics due to the unavailability of that originally requested virtual resource. For example, if a requested virtual resource with a certain deployment flavour is not possible to achieve, a new alternative virtual resource having a new alternative flavour can be considered to successfully execute an operation if it is not possible to achieve the originally requested virtual resource. Similarly, if a requested virtual resource with a certain instantiation level is not possible to achieve, a new alternative virtual resource having a new instantiation level can be considered to successfully execute an operation if it is not possible to achieve the originally requested virtual resource.

In some embodiments, the "virtual network function descriptor (VNFD)" referred to herein can define one or more alternative characteristics and may also comprise information indicative of the priorities of the different alternative characteristics. An example of an implementation to include this type of information in the virtual network function descriptor (VNFD) is the following: include a new alternative characteristic in an information element such that a priority for the different characteristics contained in a virtual network function descriptor (VNFD) information element can be specified. For example, a new alternative characteristic may be included in a virtual network function deployment flavour (VnfDf) information element such that a priority for the different deployment flavours contained in a virtual network function descriptor (VNFD) information element can be specified. An example of such a virtual network function deployment flavour (VnfDf) information element is provided below:

| Attribute | Qualifier | Cardinality | Content | Description |
| --- | --- | --- | --- | --- |
| FlavourID | M | 1 | Identifier | Identifier of deployment flavour (DF) within VNFD. |
| Description | M | 1 | String | Human readable description of DF. |
| FlavourIDPriority | O | 1 | Integer | Specify priority of DF within VNFD (for use by VNFM in the selection of an alternative flavour. See the FlavourAlternative attribute). |

As mentioned earlier, the first request 302 to manage the virtual network function (VNF) comprises an indication of whether to select an alternative virtual resource for allocation if a requested virtual resource is unavailable for allocation and, in some embodiments, the first request 302 may also comprise an indication of one or more alternative characteristics (such as an alternative flavour) on which to base the selection of an alternative virtual resource for allocation. In some embodiments, the indications may be provided as a Boolean (although other formats of which a person skilled in the art will be aware are also possible). An example of a virtual network function deployment flavour (VnfDf) information element in which this information can be provided is shown below:

| Attribute | Qualifier | Cardinality | Content | Description |
| --- | --- | --- | --- | --- |
| vnfInstanceId | M | 1 | Identifier | Identifier of VNF instance |
| FlavourID | M | 1 | Identifier | Identifier of DF within VNFD to be instantiated in priority order. |
| FlavourAlternative | M | 1 | Boolean | Specify if alternative FlavourID is to be tried if current one fails. |

An example embodiment will now be described where an alternative virtual resource is selected by the processing circuitry 22 of the virtual network function manager (VNFM). In this example embodiment, the alternative virtual resource that is selected has an alternative FlavourID. In order to select the alternative FlavourID, the processing circuitry 22 of the virtual network function manager (VNFM) reads the virtual network function deployment flavour (VnfDf) information elements to find the parameter "FlavourIDPriority", which is the parameter that directly determines which virtual network function deployment flavour (VnfDf) information element to use as the alternative FlavourID. In the case that the "FlavourIDPriority" is not present or properly defined and thus not possible to use, the processing circuitry 22 of the virtual network function manager (VNFM) may instead use internal policy rules to select the alternative FlavourID.

In an example embodiment, the virtual network function manager (VNFM) 20 may have three preconfigured internal flavour policies, as follows:
Policy1—FlavourID with higher memory has preference.
Policy2—FlavourID with higher compute resources has preference.
Policy3—FlavourID with less disk has preference.

Although three specific flavour policies are provided for the purpose of this example embodiment, it will be understood that any other flavour policies, any number of policies, and any other combination of policies is also possible.

The available preconfigured flavour policies may be provided in a list according to some embodiments. The list may be an internal list of the virtual network function manager (VNFM) 20. An operator may select one or more of these flavour policies for use in the selection of the alternative virtual resource for allocation. The operator may make this selection, for example, at a configuration start time for the virtual network function manager (VNFM) 20. The operator may select one or more of these flavour policies according to the needs of the virtual network function (VNF). The one or more selected flavour policies are applied by the control circuitry 22 of the virtual network function manager (VNFM) 20 to select an alternative virtual resource having at least one alternative characteristic. For example, the one or more selected flavour policies may applied by the control circuitry 22 of the virtual network function manager (VNFM) 20 to select an alternative virtual resource having a certain deployment flavour.

For example, if flavour Policy1 is selected, the selection mechanism may comprise the control circuitry 22 of the virtual network function manager (VNFM) 20 prioritising the deployment flavours with higher memory (since flavours with higher memory has a higher priority according to flavour Policy1). The prioritising may be performed by the control circuitry 22 of the virtual network function manager (VNFM) 20 creating an internal list ordering the deployment flavours according to their priority. In this example, the control circuitry 22 of the virtual network function manager (VNFM) 20 then selects an alternative virtual resource having a deployment flavour with the highest priority.

The type of virtual network function (VNF) that is managed according to this example embodiment only requires flavour Policy1. Flavour Policy2 and flavour Policy3 in this example embodiment are not the desired policy for the type of virtual network function (VNF) and thus they are not used. However, a different virtual network function (VNF) may, for example, require flavour Policy2 and then the same mechanism is used but configuring flavour Policy2 in the virtual network function manager (VNFM) 20 as the selected flavour policy used to manage that virtual network function (VNF).

In some embodiments, a flavour policy can define one or more flavour policy rules. The one or more flavour policy rules can indicate circumstances in which to increase a priority associated with one or more alternative characteristics. The flavour policy rules may not be pre-configured according to some embodiments, which can provide more flexibility in the decision mechanism at the virtual network function manager (VNFM) 20. In these embodiments, the policy may be defined in natural language as an operator configures the one or more desired alternative characteristics, for example, at a configuration start time for the virtual network function manager (VNFM) 20. In an example, the operator may configure the one or more desired alternative characteristics according to the following flavour policy rules:
Rule 1—Increase priority if memory required in virtual descriptor unit (vdu) is lower than a value of X.
Rule 2—Increase priority if virtual central processing unit (vcpu) required in virtual descriptor unit (vdu) is higher than a value Y.
Rule 3—Increase priority if there are not affinity or anti-affinity rules.

Although three specific flavour policy rules are provided for the purpose of this example embodiment, it will be understood that any other flavour policy rules, any number of flavour policy rules, and any other combination of flavour policy rules is also possible.

The control circuitry 22 of the virtual network function manager (VNFM) 20 applies a policy (a flavour policy in this example embodiment) and this results in the control circuitry 22 of the virtual network function manager (VNFM) 20 prioritising the one or more desired alternative characteristics (one or more alternative flavours in this example embodiment) according to the defined policy rules (the flavour policy rules in this example embodiment). The virtual network function manager (VNFM) 20 can, for example, create an internal list ordering the one or more alternative characteristics according to the policy rules within the policy. The control circuitry 22 of the virtual network function manager (VNFM) 20 may then select an alternative virtual resource having a characteristic (a flavour in this example embodiment) with the highest priority.

Another example embodiment will now be described where an alternative virtual resource is selected by the processing circuitry 22 of the virtual network function manager (VNFM). In this example embodiment, the alternative virtual resource that is selected has an alternative InstantiationLevelID. As mentioned earlier, the first request 302 to manage the virtual network function (VNF) comprises an indication of whether to select an alternative virtual resource for allocation if a requested virtual resource is unavailable for allocation and, in some embodiments, the first request 302 may also comprise an indication of one or more alternative characteristics (such as the alternative instantiation level) on which to base the selection of an alternative virtual resource for allocation. In some embodiments, the indications may be provided as a Boolean (although other formats of which a person skilled in the art will be aware are also possible). An example of a virtual network function deployment flavour (VnfDf) information element in which this information can be provided is shown below:

The available preconfigured instantiation policies may be provided in a list according to some embodiments. The list may be an internal list of the virtual network function manager (VNFM) 20. An operator may select one or more of these instantiation policies for use in the selection of the alternative virtual resource for allocation. The operator may make this selection, for example, at a configuration start time for the virtual network function manager (VNFM) 20. The operator may select one or more of these instantiation policies according to the needs of the virtual network function (VNF). The one or more selected instantiation policies are applied by the control circuitry 22 of the virtual network function manager (VNFM) 20 to select an alternative virtual resource having at least one alternative characteristic. For example, the one or more selected instantiation policies may applied by the control circuitry 22 of the virtual network function manager (VNFM) 20 to select an alternative virtual resource having a certain instantiation level.

For example, if instantiation Policy2ScaleOut is selected, the selection mechanism may comprise the processing circuitry 22 of the virtual network function manager (VNFM) 20 calculating the new alternative instantiation level by reducing the number of virtual machines (VMs) up to 50% of the initial first request 302. For example, if the initial instantionLevelID was four virtual machines (VMs), the processing circuitry 22 of the virtual network function manager (VNFM) 20 will first try three virtual machines (VMs) and then two virtual machines (VMs), but no less than two virtual machines (VMs), since this is 50% of the original value of four virtual machines (VMs).

| Attribute | Qualifier | Cardinality | Content | Description |
|---|---|---|---|---|
| vnfInstanceId | M | 1 | Identifier | Identifier of the VNF instance |
| . . . | . . . | . . . | . . . | . . . |
| InstantiationLevelID Alternative | O | 1 | Boolean | Specify if alternative InstantiationLevelID is to be tried if current one fails. |

In order to select the alternative InstantiationID, the processing circuitry 22 of the virtual network function manager (VNFM) reads the virtual network function deployment flavour (VnfDf) information elements to determine which virtual network function deployment flavour (VnfDf) information element to use as the alternative InstantiationLevelID. Alternatively to the Boolean shown above, the first request 302 from the network functions virtualisation orchestration (NFVO) 10 may directly include a list of alternatives. In the case that the "InstantiationLevelIDAlternative" is not present or properly defined and thus it is not possible use it, the processing circuitry 22 of the virtual network function manager (VNFM) may instead use internal instantiation policy rules to select the alternative InstantiationLevelID.

In an example embodiment, the virtual network function manager (VNFM) 20 may have three preconfigured internal instantiation level policies, as follows:

Policy1ScaleOut—Scale up to maximum value allowed by the infrastructure.

Policy2ScaleOut—Scale at least up to 50% of the required level.

Although two specific instantiation policies are provided for the purpose of this example embodiment, it will be understood that any other instantiation policies, any number of instantiation policies, and any other combination of instantiation policies is also possible.

The type of virtual network function (VNF) that is managed according to this example embodiment only requires instantiation Policy2ScaleOut. Thus, instantiation Policy1ScaleOut in this example embodiment is not the desired instantiation policy for the type of virtual network function (VNF) and thus is not used. However, a different virtual network function (VNF) may, for example, require instantiation Policy1ScaleOut and then the same mechanism is used but configuring instantiation Policy1ScaleOut in the virtual network function manager (VNFM) 20 as the selected instantiation policy used to manage that virtual network function (VNF).

In some embodiments, an instantiation policy can define one or more instantiation policy rules. The one or more instantiation policy rules can indicate circumstances in which to reduce the instantiation level. The instantiation policy rules may not be pre-configured according to some embodiments, which can provide more flexibility in the decision mechanism at the virtual network function manager (VNFM) 20. In these embodiments, the instantiation policy may be defined in natural language as an operator configures the one or more desired alternative characteristics, for example, at a configuration start time for the virtual network function manager (VNFM) 20. In an example, the operator may configure the one or more desired alternative characteristics according to the following instantiation policy rules:

Rule 1—Reduce required InstantiationLevel by 5% if memory required in virtual descriptor unit (vdu) is higher than a value X Rule 2—Reduce required InstantiationLevel by 5% if virtual central processing unit (vcpu) required in virtual descriptor unit (vdu) is higher than a value Y Rule 3—Reduce required InstantiationLevel by 5% if current InstantiationLevel is higher than a default level ("DefaultInstantiationLevelId")

Although three specific instantiation policy rules are provided for the purpose of this example embodiment, it will be understood that any other instantiation policy rules, any number of instantiation policy rules, and any other combination of instantiation policy rules is also possible.

The control circuitry 22 of the virtual network function manager (VNFM) 20 can apply the instantiation policy to the InstantiationLevel requested by the network functions virtualisation orchestration (NFVO) 10 and this results in a concrete, new and smaller InstantiationLevel. This new InstantiationLevel is the alternative for the alternative virtual resource that is selected and requested to the virtual infrastructure manager (VIM) 30. In case the alternative InstantiationLevel is not accepted by the virtual infrastructure manager (VIM) 30 (for example, due to unsuccessful resource reservation), the control circuitry 22 of the virtual network function manager (VNFM) 20 can apply the instantiation policy again to calculate a new one.

In addition to the flavour and instantiation policies for use in selecting an alternative FlavourID and an alternative InstantiationLevelID respectively, such as those described earlier, there is a relation between these parameters and thus the control circuitry 22 of the virtual network function manager (VNFM) 20 can be configured to apply an alternative Flavour or an alternative InstantiationLevel individually or in parallel. There may be policies provided in the virtual network function manager (VNFM) 20 for use in selecting whether to apply an alternative Flavour or an alternative InstantiationLevel individually or in parallel. These policies may be referred to as "flavour vs instantiation" policies.

In an example, the "flavour vs instantiation" policies in the virtual network function manager (VNFM) 20 for use in selecting whether to apply an alternative Flavour or an alternative InstantiationLevel individually or in parallel may comprise the following:

FirstAlternativeLevel—Apply FlavourID specified and, if not possible, apply alternative InstantiationLevelID.

FirstAlternativeFlavour—Apply FlavourID specified and, if not possible, apply alternative FlavourID BothFlavourinstantionLevel—Apply both alternative FlavourID and InstantionLevelID in parallel.

In the manner described earlier, the virtual network function descriptor (VNFD) can be advantageously complemented with flavour priorities, requests from the network functions virtualisation orchestration (NFVO) 10 to the virtual network function manager (VNFM) 20 advantageously indicate whether alternatives to characteristics (such as flavour and instantiation level) are acceptable, new policies in the virtual network function manager (VNFM) can advantageously control different execution possibilities and alternatives, and the virtual network function manager (VNFM) can advantageously use the extra information and policies to appropriately select alternative virtual resources where necessary.

Figure 5:
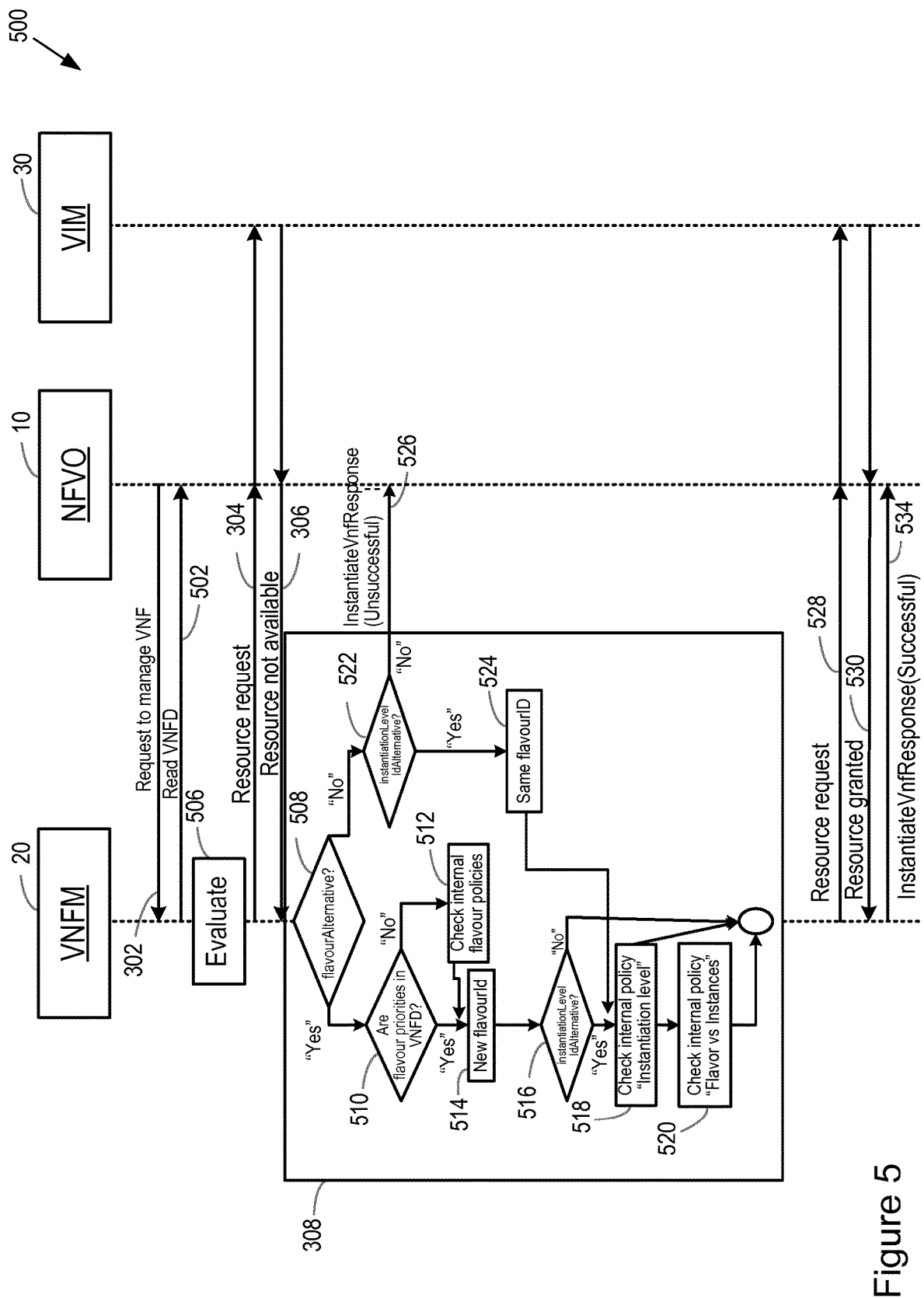
FIG. 5 is a signalling diagram illustrating the signals in a virtualisation environment in accordance with an example embodiment.

FIG. 5 is a signalling diagram illustrating the signals in a virtualisation environment 500 in accordance with an example embodiment. The visualisation environment 500 according to this example embodiment comprises a network functions virtualisation orchestration (NFVO) 10 comprising processing circuitry 12 configured in the manner described earlier with reference to FIG. 1A and that generally operates in the manner described earlier with reference to FIG. 4A, a virtual network function manager (VNFM) 20 comprising processing circuitry 22 configured in the manner described earlier with reference to FIG. 1B and that generally operates in the manner described earlier with reference to FIG. 4B, and a virtual infrastructure manager (VIM) 30. The network functions virtualisation orchestration (NFVO) 10 and the virtual network function manager (VNFM) 20 are arranged to manage a virtual network function (VNF).

With reference to FIG. 5, a first request 302 to manage a virtual network function (VNF) is transmitted by the network functions virtualisation orchestration (NFVO) 10. More specifically, the first request 302 to manage the virtual network function (VNF) is transmitted from the network functions virtualisation orchestration (NFVO) 10 to the virtual network function manager (VNFM) 20. Thus, the method described earlier with reference to block 402 of FIG. 4A is performed. In the illustrated example embodiment of FIG. 5, the first request 302 to manage a virtual network function (VNF) is a request to instantiate the virtual network function (VNF), which may be referred to as an "InstantiateVnfRequest".

The first request 302 to manage a virtual network function (VNF) comprises an indication of whether to select an alternative virtual resource for allocation if a requested virtual resource is unavailable for allocation. The first request 302 to manage a virtual network function (VNF) may also comprise one or more predefined characteristics for a virtual resource associated with the first request 302 (such as the predefined characteristics FlavourID and InstantiationLevelID mentioned earlier). In some embodiments, the first request 302 to manage the virtual network function (VNF) may further comprise an indication of one or more alternative characteristics on which to base the selection of an alternative virtual resource for allocation (such as the alternative characteristics FlavourAlternative and an Instantiation LevelIDAlternative mentioned earlier). The first request 302 to manage the virtual network function (VNF) is received at the virtual network function manager (VNFM) 20. Thus, the method described earlier with reference to block 404 of FIG. 4B is performed. More specifically, in the example embodiment illustrated in FIG. 5, the first request 302 to manage the virtual network function (VNF) is received at the virtual network function manager (VNFM) 20 from the network functions virtualisation orchestration (NFVO) 10.

In the example embodiment illustrated in FIG. 5, a virtual network function descriptor (VNFD) is read by the virtual network function manager (VNFM) 20 from the network functions virtualisation orchestration (NFVO) 10. In the example embodiment illustrated in FIG. 5, the virtual network function descriptor (VNFD) at the network functions virtualisation orchestration (NFVO) 10 defines one or more alternative characteristics and may also comprise information indicative of the priorities of the different alternative characteristics (such as a FlavourID, a corresponding Description, and a corresponding FlavourIDPriority, as illustrated in the earlier table). At block 506 of FIG. 5, all inputs are evaluated and the processing circuitry 22 of the virtual network function manager (VNFM) 20 is executed to begin management of the virtual network function (VNF).

A second request 304 for a virtual resource associated with the first request 302 to manage the virtual network function (VNF) is transmitted from the virtual network function manager (VNFM) 20. Thus, the method described earlier with reference to block 406 of FIG. 4B is performed. More specifically, in the illustrated example embodiment of FIG. 5, the second request 304 for a virtual resource associated with the first request 302 to manage the virtual network function (VNF) is transmitted from the virtual network function manager (VNFM) 20 to the virtual infrastructure manager (VIM) 30. The requested virtual resource has one or more predefined characteristics. A response 306 that indicates whether the virtual resource having the one or more predefined characteristics is available for allocation is transmitted from the virtual infrastructure manager (VIM) 30 and is received at the virtual network function manager (VNFM) 20.

In the illustrated example embodiment of FIG. 5, a response 306 is received from the network functions virtualisation orchestration (NFVO) 10 at the virtual network function manager (VNFM) 20 that indicates the virtual resource having the one or more predefined characteristics is unavailable for allocation. Thus, the method described earlier with reference to block 408 of FIG. 4B is performed. More specifically, in the illustrated example embodiment of FIG. 5, the response 306 that indicates the virtual resource having the one or more predefined characteristics is unavailable for allocation is received from the virtual infrastructure manager (VIM) 30.

At block 308 of FIG. 5, an alternative virtual resource is selected for allocation. Thus, the method described earlier with reference to block 308 of FIG. 3 and block 412 of FIG. 4B is performed. In more detail, in the example embodiment illustrated in FIG. 5, at block 508, the processing circuitry 22 of the virtual network function manager (VNFM) 20 determines whether the first request 302 to manage the virtual network function (VNF) comprises an alternative deployment flavour, FlavourAlternativeID. If it is determined that the first request 302 to manage the virtual network function (VNF) does comprise an alternative deployment flavour, the process moves to block 510 of FIG. 5 and the processing circuitry 22 of the virtual network function manager (VNFM) 20 determines whether the virtual network function descriptor (VNFD) comprises priorities for one or more alternative deployment flavours. If not, at block 512 of FIG. 5, the processing circuitry 22 of the virtual network function manager (VNFM) 20 checks internal flavour policies (such as those mentioned earlier) and the process moves to block 514 of FIG. 5. On the other hand, if it is determined at block 510 of FIG. 5 that the virtual network function descriptor (VNFD) comprises priorities for one or more alternative deployment flavours, the process moves straight to block 514 of FIG. 5. At block 514 of FIG. 5, the processing circuitry 22 of the virtual network function manager (VNFM) 20 selects an alternative deployment flavour.

At block 516 of FIG. 5, the processing circuitry 22 of the virtual network function manager (VNFM) 20 determines whether the first request 302 to manage the virtual network function (VNF) comprises an alternative instantiation level. If, at block 516 of FIG. 5, it is determined that the first request 302 to manage the virtual network function (VNF) comprises an alternative instantiation level, the process moves to block 518 of FIG. 5 and the processing circuitry 22 of the virtual network function manager (VNFM) 20 checks internal instantiation level policies (such as those mentioned earlier). At block 520 of FIG. 5, the processing circuitry 22 of the virtual network function manager (VNFM) 20 checks internal "flavour vs instantiation" policies (such as those mentioned earlier). The alternative virtual resource selected by the processing circuitry 22 of the virtual network function manager (VNFM) in this case has a different deployment flavour and a different instantiation level to the originally requested virtual resource. On the other hand, if it is determined at block 516 of FIG. 5 that the first request 302 to manage the virtual network function (VNF) does not comprises an alternative instantiation level, the alternative virtual resource selected by the processing circuitry 22 of the virtual network function manager (VNFM) in this case has a different deployment flavour but the same instantiation level to the originally requested virtual resource.

If, at block 508 of FIG. 5, it is determined that the first request 302 to manage the virtual network function (VNF) does not comprise an alternative deployment flavour, the process instead moves to block 522 of FIG. 5 and the processing circuitry 22 of the virtual network function manager (VNFM) 20 determines whether the first request 302 to manage the virtual network function (VNF) comprises an alternative instantiation level. If it is determined at block 522 of FIG. 5 that the first request 302 to manage the virtual network function (VNF) does not comprise an alternative instantiation level, a response 526 is transmitted from the virtual network function manager (VNFM) 20 to the network functions virtualisation orchestration (NFVO) 10 indicating that resource allocation and thus the requested virtual network function (VNF) management is unsuccessful. This response may be referred to as "IntantiateVnfResponse(Unsuccessful)".

On the other hand, if it is determined at block 522 of FIG. 5 that the first request 302 to manage the virtual network function (VNF) does comprise an alternative instantiation level, the processing circuitry 22 of the virtual network function manager (VNFM) selects the same deployment flavour. The process then moves to block 518 where the processing circuitry 22 of the virtual network function manager (VNFM) 20 checks internal instantiation level policies (such as those mentioned earlier). The processing circuitry 22 of the virtual network function manager (VNFM) then selects an alternative virtual resource having the same deployment flavour but a different instantiation level to the originally requested virtual resource.

A third request 528 for the selected alternative virtual resource virtual resource is transmitted from the virtual network function manager (VNFM) 20. More specifically, in the illustrated example embodiment of FIG. 5, the third request 528 for the selected alternative virtual resource is transmitted from the virtual network function manager (VNFM) 20 to the virtual infrastructure manager (VIM) 30. A response 530 that indicates whether the selected alternative virtual resource is available for allocation is transmitted from the virtual infrastructure manager (VIM) 30 and is received at the virtual network function manager (VNFM) 20. In the illustrated example embodiment of FIG. 5, the response 530 indicates that the selected alternative virtual resource is available for allocation and, more specifically, that the selected alternative virtual resource is granted for allocation. In this case, a response 534 is transmitted from the virtual network function manager (VNFM) 20 to the network functions virtualisation orchestration (NFVO) 10 indicating that resource allocation and thus the requested virtual network function (VNF) management is successful. This response 534 may be referred to as "IntantiateVnfResponse(Successful)".

If, on the other hand, the response 530 indicates that the selected alternative virtual resource is unavailable for allocation, the process of selecting an alternative virtual resource in the manner described earlier may be repeated for further alternative virtual resources until a selected further alternative virtual resource is available for allocation or until a maximum value of selections is reached.

Figure 6:
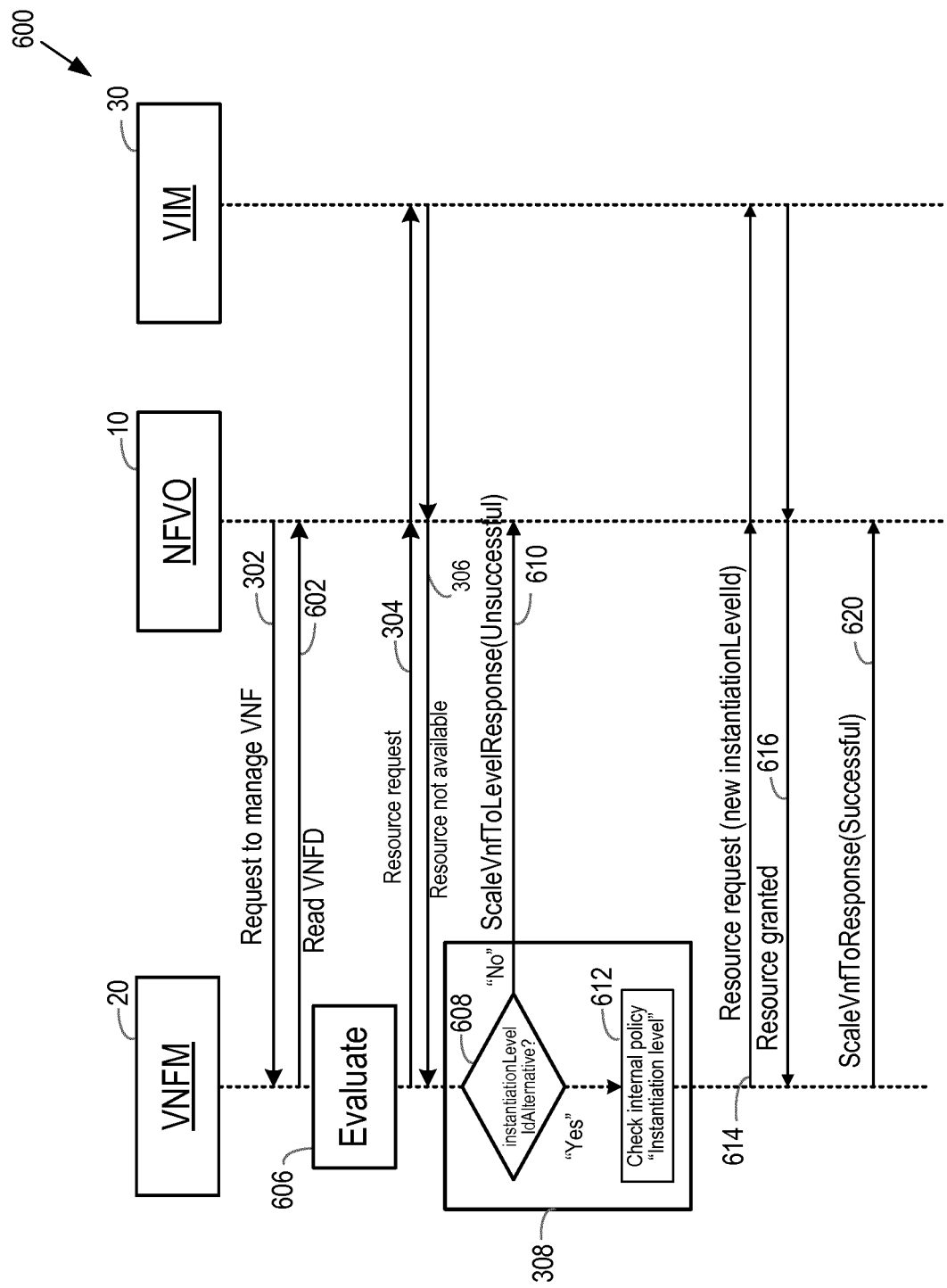
FIG. 6 is a signalling diagram illustrating the signals in a virtualisation environment in accordance with another example embodiment.

FIG. 6 is a signalling diagram illustrating the signals in a virtualisation environment 600 in accordance with another example embodiment. The visualisation environment 600 according to this example embodiment comprises a network functions virtualisation orchestration (NFVO) 10 comprising processing circuitry 12 configured in the manner described earlier with reference to FIG. 1A and that generally operates in the manner described earlier with reference to FIG. 4A, a virtual network function manager (VNFM) 20 comprising processing circuitry 22 configured in the manner described earlier with reference to FIG. 1B and that generally operates in the manner described earlier with reference to FIG. 4B, and a virtual infrastructure manager (VIM) 30. The network functions virtualisation orchestration (NFVO) 10 and the virtual network function manager (VNFM) 20 are arranged to manage a virtual network function (VNF).

With reference to FIG. 6, a first request 302 to manage a virtual network function (VNF) is transmitted by the network functions virtualisation orchestration (NFVO) 10. More specifically, the first request 302 to manage the virtual network function (VNF) is transmitted from the network functions virtualisation orchestration (NFVO) 10 to the virtual network function manager (VNFM) 20. Thus, the method described earlier with reference to block 402 of FIG. 4A is performed. In the illustrated example embodiment of FIG. 6, the first request 302 to manage a virtual network function (VNF) is a request to scale the virtual network function (VNF) to a predefined level, which may be referred to as a "ScaleVnfToLevelRequest".

The first request 302 to manage a virtual network function (VNF) comprises an indication of whether to select an alternative virtual resource for allocation if a requested virtual resource is unavailable for allocation. The first request 302 to manage a virtual network function (VNF) may also comprise one or more predefined characteristics for a virtual resource associated with the first request 302 (such as the predefined characteristic InstantiationLevelID mentioned earlier). In some embodiments, the first request 302 to manage the virtual network function (VNF) may further comprise an indication of one or more alternative characteristics on which to base the selection of an alternative virtual resource for allocation (such as the alternative characteristic InstantiationLevelIDAlternative mentioned earlier). The first request 302 to manage the virtual network function (VNF) is received at the virtual network function manager (VNFM) 20. Thus, the method described earlier with reference to block 404 of FIG. 4B is performed. More specifically, in the example embodiment illustrated in FIG. 5, the first request 302 to manage the virtual network function (VNF) is received at the virtual network function manager (VNFM) 20 from the network functions virtualisation orchestration (NFVO) 10.

In the example embodiment illustrated in FIG. 6, a virtual network function descriptor (VNFD) is read by the virtual network function manager (VNFM) 20 from the network functions virtualisation orchestration (NFVO) 10. In the example embodiment illustrated in FIG. 6, the virtual network function descriptor (VNFD) at the network functions virtualisation orchestration (NFVO) 10 defines one or more alternative characteristics and may also comprise information indicative of the priorities of the different alternative characteristics (such as a FlavourID, a corresponding Description, a corresponding FlavourIDPriority, as illustrated in the earlier table). At block 606 of FIG. 6, all inputs are evaluated and the processing circuitry 22 of the virtual network function manager (VNFM) 20 is executed to begin management of the virtual network function (VNF).

A second request 304 for a virtual resource associated with the first request 302 to manage the virtual network function (VNF) is transmitted from the virtual network function manager (VNFM) 20. Thus, the method described earlier with reference to block 406 of FIG. 4B is performed. More specifically, in the illustrated example embodiment of FIG. 6, the second request 304 for a virtual resource associated with the first request 302 to manage the virtual network function (VNF) is transmitted from the virtual network function manager (VNFM) 20 to the virtual infrastructure manager (VIM) 30. The requested virtual resource has one or more predefined characteristics. A response 306 that indicates whether the virtual resource having the one or more predefined characteristics is available for allocation is transmitted from the virtual infrastructure manager (VIM) 30 and is received at the virtual network function manager (VNFM) 20.

In the illustrated example embodiment of FIG. 6, a response 306 is received from the network functions virtualisation orchestration (NFVO) 10 at the virtual network function manager (VNFM) 20 that indicates the virtual resource having the one or more predefined characteristics is unavailable for allocation. Thus, the method described earlier with reference to block 408 of FIG. 4B is performed. More specifically, in the illustrated example embodiment of FIG. 6, the response 306 that indicates the virtual resource having the one or more predefined characteristics is unavailable for allocation is received from the virtual infrastructure manager (VIM) 30.

At block 308 of FIG. 6, an alternative virtual resource is selected for allocation. Thus, the method described earlier with reference to block 308 of FIG. 3 and block 412 of FIG. 4B is performed. In more detail, in the example embodiment illustrated in FIG. 6, at block 608, the processing circuitry 22 of the virtual network function manager (VNFM) 20 determines whether the first request 302 to manage the virtual network function (VNF) comprises an alternative instantiation level. If it is determined at block 608 of FIG. 6 that the first request 302 to manage the virtual network function (VNF) does not comprise an alternative instantiation level, a response 610 is transmitted from the virtual network function manager (VNFM) 20 to the network functions virtualisation orchestration (NFVO) 10 indicating that resource allocation and thus the requested virtual network function (VNF) management is unsuccessful. This response may be referred to as "ScaleVnfToResponse(Unsuccessful)".

On the other hand, if it is determined at block 608 of FIG. 6 that the first request 302 to manage the virtual network function (VNF) comprises an alternative instantiation level, the process moves to block 612 of FIG. 6 and the processing circuitry 22 of the virtual network function manager (VNFM) 20 checks internal instantiation level policies (such as those mentioned earlier). The processing circuitry 22 of the virtual network function manager (VNFM) 20 then selects an alternative virtual resource having at least one alternative characteristic. More specifically, in this illustrated example embodiment, the alternative virtual resource selected by the processing circuitry 22 of the virtual network function manager (VNFM) has a different instantiation level to the originally requested virtual resource.

A third request 614 for the selected alternative virtual resource virtual resource is transmitted from the virtual network function manager (VNFM) 20. More specifically, in the illustrated example embodiment of FIG. 6, the third request 614 for the selected alternative virtual resource is transmitted from the virtual network function manager (VNFM) 20 to the virtual infrastructure manager (VIM) 30. A response 616 that indicates whether the selected alternative virtual resource is available for allocation is transmitted from the virtual infrastructure manager (VIM) 30 and is received at the virtual network function manager (VNFM) 20. In the illustrated example embodiment of FIG. 6, the response 616 indicates that the selected alternative virtual resource is available for allocation and, more specifically, that the selected alternative virtual resource is granted for allocation. In this case, a response 620 is transmitted from the virtual network function manager (VNFM) 20 to the network functions virtualisation orchestration (NFVO) 10 indicating that resource allocation and thus the requested virtual network function (VNF) management is successful. This response 620 may be referred to as "ScaleVnfToResponse(Successful)".

If, on the other hand, the response 630 indicates that the selected alternative virtual resource is unavailable for allocation, the process of selecting an alternative virtual resource in the manner described earlier may be repeated for further alternative virtual resources until a selected further alternative virtual resource is available for allocation or until a maximum value of selections is reached.

Figure 7:
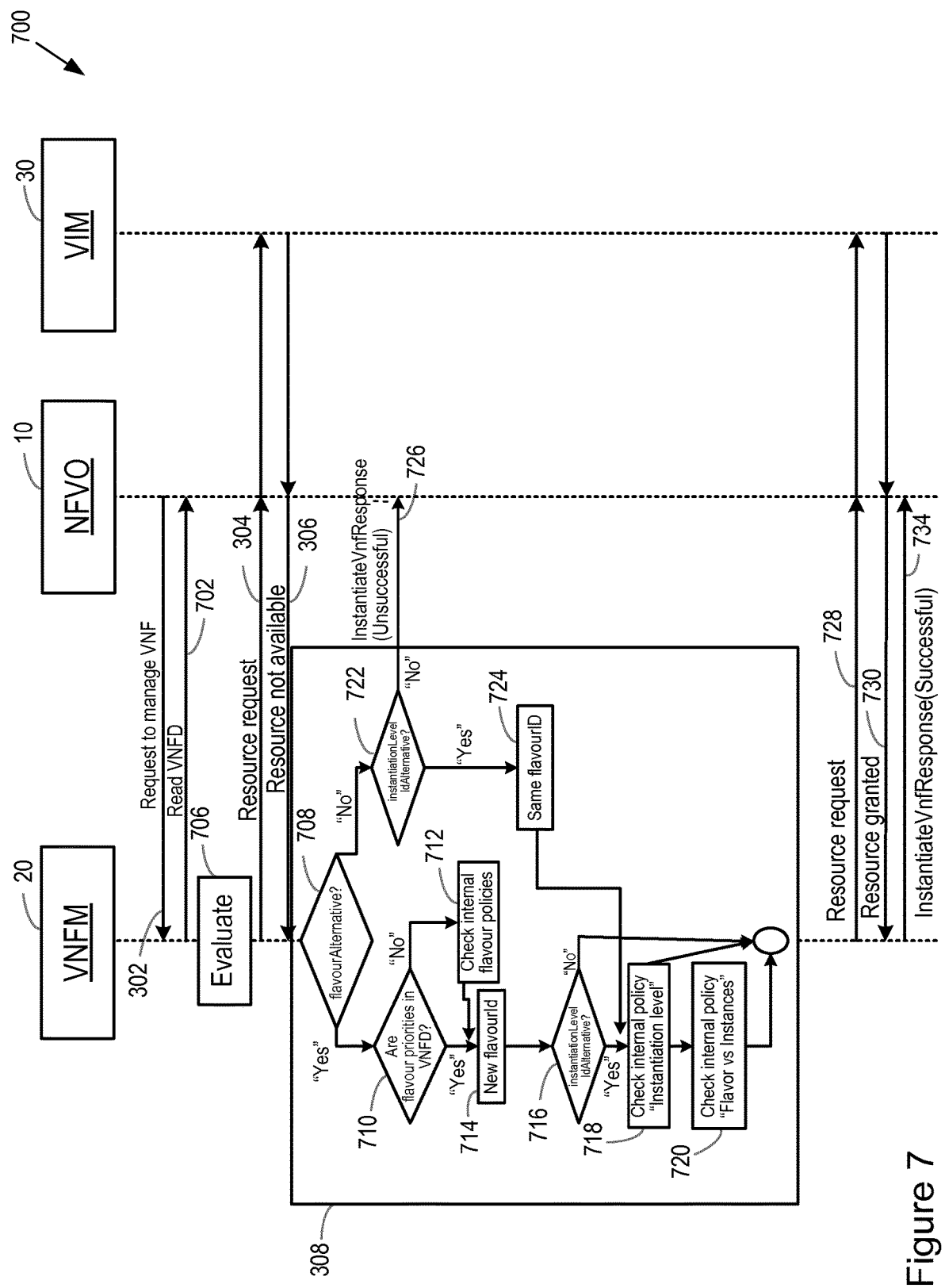
FIG. 7 is a signalling diagram illustrating the signals in a virtualisation environment in accordance with another example embodiment.

FIG. 7 is a signalling diagram illustrating the signals in a virtualisation environment 700 in accordance with another example embodiment. The visualisation environment 700 according to this example embodiment comprises a network functions virtualisation orchestration (NFVO) 10 comprising processing circuitry 12 configured in the manner described earlier with reference to FIG. 1A and that generally operates in the manner described earlier with reference to FIG. 4A, a virtual network function manager (VNFM) 20 comprising processing circuitry 22 configured in the manner described earlier with reference to FIG. 1B and that generally operates in the manner described earlier with reference to FIG. 4B, and a virtual infrastructure manager (VIM) 30. The network functions virtualisation orchestration (NFVO) 10 and the virtual network function manager (VNFM) 20 are arranged to manage a virtual network function (VNF).

With reference to FIG. 7, a first request 302 to manage a virtual network function (VNF) is transmitted by the network functions virtualisation orchestration (NFVO) 10. More specifically, the first request 302 to manage the virtual network function (VNF) is transmitted from the network functions virtualisation orchestration (NFVO) 10 to the virtual network function manager (VNFM) 20. Thus, the method described earlier with reference to block 402 of FIG. 4A is performed. In the illustrated example embodiment of FIG. 7, the first request 302 to manage a virtual network function (VNF) is a request to change the deployment flavour of the virtual network function (VNF), which may be referred to as a "ChangeVnfFlavourRequest".

The first request 302 to manage a virtual network function (VNF) comprises an indication of whether to select an alternative virtual resource for allocation if a requested virtual resource is unavailable for allocation. The first request 302 to manage a virtual network function (VNF) may also comprise one or more predefined characteristics for a virtual resource associated with the first request 302 (such as the predefined characteristics FlavourID and InstantiationLevelID mentioned earlier). In some embodiments, the first request 302 to manage the virtual network function (VNF) may further comprise an indication of one or more alternative characteristics on which to base the selection of an alternative virtual resource for allocation (such as the alternative characteristics FlavourAlternative and InstantiationLevelIDAlternative mentioned earlier). The first request 302 to manage the virtual network function (VNF) is received at the virtual network function manager (VNFM) 20. Thus, the method described earlier with reference to block 404 of FIG. 4B is performed. More specifically, in the example embodiment illustrated in FIG. 7, the first request 302 to manage the virtual network function (VNF) is received at the virtual network function manager (VNFM) 20 from the network functions virtualisation orchestration (NFVO) 10.

In the example embodiment illustrated in FIG. 7, a virtual network function descriptor (VNFD) is read by the virtual network function manager (VNFM) 20 from the network functions virtualisation orchestration (NFVO) 10. In the example embodiment illustrated in FIG. 7, the virtual network function descriptor (VNFD) at the network functions virtualisation orchestration (NFVO) 10 defines one or more alternative characteristics and may also comprise information indicative of the priorities of the different alternative characteristics (such as a FlavourID, a corresponding Description, and a corresponding FlavourIDPriority, as illustrated in the earlier table). At block 706 of FIG. 7, all inputs are evaluated and the processing circuitry 22 of the virtual network function manager (VNFM) 20 is executed to begin management of the virtual network function (VNF).

A second request 304 for a virtual resource associated with the first request 302 to manage the virtual network function (VNF) is transmitted from the virtual network function manager (VNFM) 20. Thus, the method described earlier with reference to block 406 of FIG. 4B is performed. More specifically, in the illustrated example embodiment of FIG. 7, the first request 304 for a virtual resource associated with the first request 302 to manage the virtual network function (VNF) is transmitted from the virtual network function manager (VNFM) 20 to the virtual infrastructure manager (VIM) 30. The requested virtual resource has one or more predefined characteristics. A response 306 that indicates whether the virtual resource having the one or more predefined characteristics is available for allocation is transmitted from the virtual infrastructure manager (VIM) 30 and is received at the virtual network function manager (VNFM) 20.

In the illustrated example embodiment of FIG. 7, a response 306 is received from the network functions virtualisation orchestration (NFVO) 10 at the virtual network function manager (VNFM) 20 that indicates the virtual resource having the one or more predefined characteristics is unavailable for allocation. Thus, the method described earlier with reference to block 408 of FIG. 4B is performed. More specifically, in the illustrated example embodiment of FIG. 7, the response 306 that indicates the virtual resource having the one or more predefined characteristics is unavailable for allocation is received from the virtual infrastructure manager (VIM) 30.

At block 308 of FIG. 7, an alternative virtual resource is selected for allocation. Thus, the method described earlier with reference to block 308 of FIG. 3 and block 412 of FIG. 4B is performed. In more detail, in the example embodiment illustrated in FIG. 7, the process of selecting an alternative virtual resource comprises blocks 708, 710, 712, 714, 716, 718, 720, 722 and 724 of FIG. 7, which correspond to blocks 508, 510, 512, 514, 516, 518, 520, 522 and 524 of FIG. 5 and thus the earlier description corresponding to these blocks will be understood to apply but will not be repeated here. If it is not possible to select an alternative virtual resource in the example embodiment illustrated in FIG. 7, a response 726 is transmitted from the virtual network function manager (VNFM) 20 to the network functions virtualisation orchestration (NFVO) 10 indicating that resource allocation and thus the requested virtual network function (VNF) management is unsuccessful. This response may be referred to as "ChangeVnfFlavourResponse(Unsuccessful)".

On the other hand, if it is possible to select an alternative resource, a third request 728 for the selected alternative virtual resource virtual resource is transmitted from the virtual network function manager (VNFM) 20. More specifically, in the illustrated example embodiment of FIG. 7, the third request 528 for the selected alternative virtual resource is transmitted from the virtual network function manager (VNFM) 20 to the virtual infrastructure manager (VIM) 30. A response 730 that indicates whether the selected alternative virtual resource is available for allocation is transmitted from the virtual infrastructure manager (VIM) 30 and is received at the virtual network function manager (VNFM) 20. In the illustrated example embodiment of FIG. 7, the response 730 indicates that the selected alternative virtual resource is available for allocation and, more specifically, that the selected alternative virtual resource is granted for allocation. A response 734 is transmitted from the virtual network function manager (VNFM) 20 to the network functions virtualisation orchestration (NFVO) 10 indicating that resource allocation and thus the requested virtual network function (VNF) management is successful. This response 734 may be referred to as "ChangeVnfFlavourResponse(Unsuccessful)".

If, on the other hand, the response 730 indicates that the selected alternative virtual resource is unavailable for allocation, the process of selecting an alternative virtual resource in the manner described earlier may be repeated for further alternative virtual resources until a selected further alternative virtual resource is available for allocation or until a maximum value of selections is reached.

Figure 8:
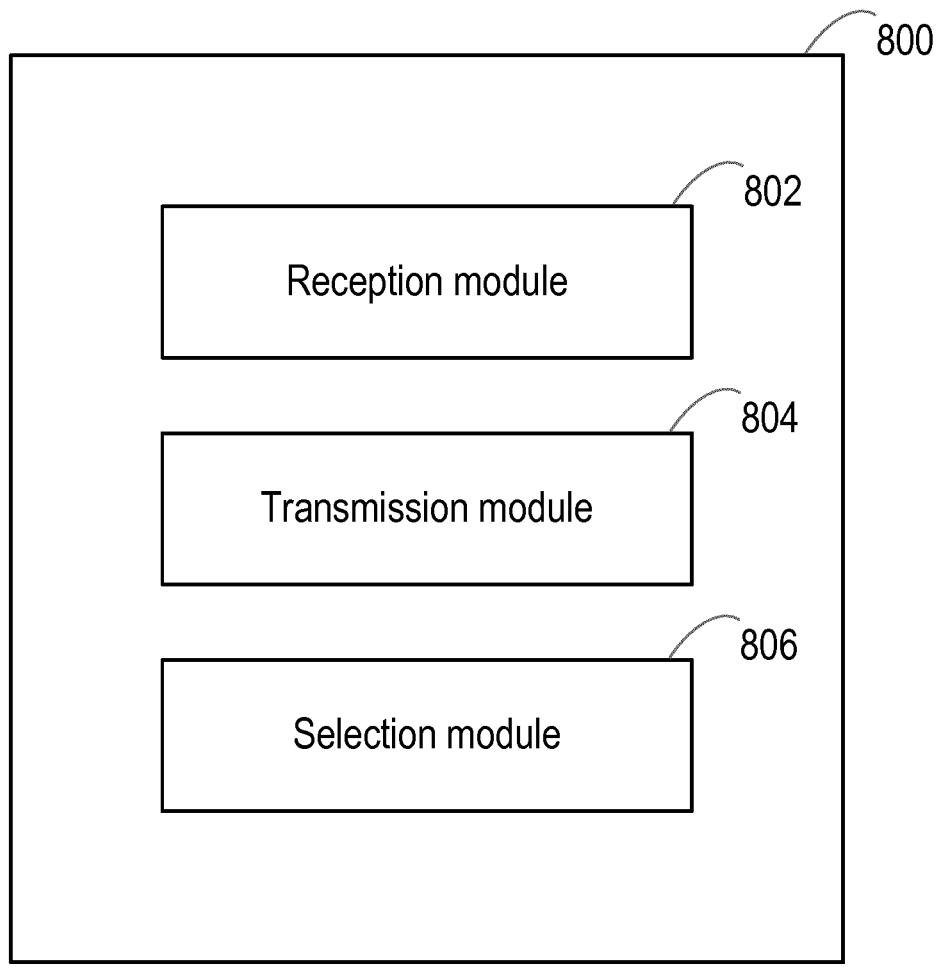
FIG. 8 is a block diagram illustrating a virtual network function manager (VNFM) in accordance with an embodiment.

FIG. 8 is a block diagram illustrating a virtual network function manager (VNFM) 800 in accordance with an embodiment. The virtual network function manager 800 is arranged to manage a virtual network function (VNF). The virtual network function manager 800 comprises a reception module 802 configured to receive a first request to manage a virtual network function. The first request comprises an indication of whether to select an alternative virtual resource for allocation if a requested virtual resource is unavailable for allocation. The virtual network function manager 800 also comprises a transmission module 804 configured to transmit a second request for a virtual resource associated with the first request to manage the virtual network function. The requested virtual resource has one or more predefined characteristics. The virtual network function manager 800 also comprises a selection module 804 configured to select an alternative virtual resource for allocation, if a response is received that indicates the virtual resource having the one or more predefined characteristics is unavailable for allocation. The alternative virtual resource has one or more alternative characteristics comprising at least one alternative characteristic that is different to a corresponding one of the predefined characteristics.

Figure 9:
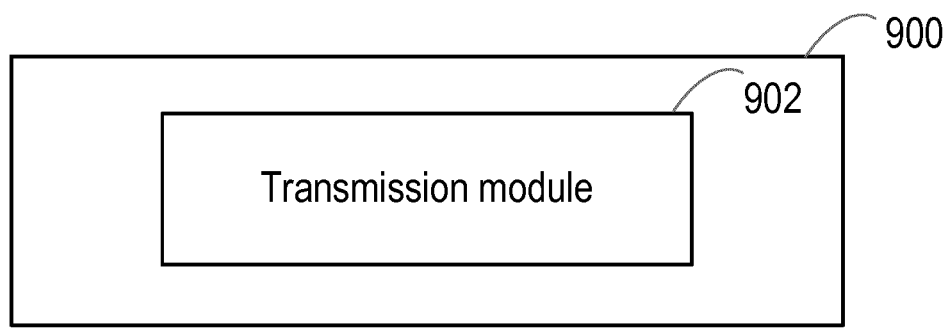
FIG. 9 is a block diagram illustrating a network functions virtualisation orchestration (NFVO) in accordance with an embodiment.

FIG. 9 is a block diagram illustrating a network functions virtualisation orchestration (NFVO) 900 in accordance with an embodiment. The network functions virtualisation orchestration 900 is arranged to manage a virtual network function (VNF). The network functions virtualisation orchestration 900 comprises a transmission module 902 configured to transmit a first request to manage a virtual network function. The first request comprises an indication of whether to select an alternative virtual resource for allocation if a requested virtual resource is unavailable for allocation.

There is also provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

There is thus advantageously provided herein an improved means for managing a virtual network function.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of operating a virtual network function manager for management of a virtual network function, the method comprising:
   receiving a first request to manage a virtual network function, wherein the first request comprises an indication of whether to select an alternative virtual resource for allocation if a requested virtual resource is unavailable for allocation;
   transmitting a second request for a virtual resource associated with the first request to manage the virtual network function, the requested virtual resource having one or more predefined characteristics;
   if a response is received that indicates the virtual resource having the one or more predefined characteristics is unavailable for allocation:
   selecting an alternative virtual resource for allocation, the alternative virtual resource having one or more alternative characteristics comprising at least one alternative characteristic that is different to a corresponding one of the predefined characteristics.

2. The method as claimed in claim 1, wherein the one or more predefined characteristics comprise any one or more of:
   a predefined parameter defining an infrastructure of a virtualisation environment; and
   a predefined instantiation level defining a level at which software instances are created in the virtualisation environment.

3. The method as claimed in claim 2, wherein the one or more predefined characteristics comprise the predefined parameter and the predefined instantiation level and the one or more alternative characteristics comprise:
   a parameter that is the same as the predefined parameter and an instantiation level that is different to the predefined instantiation level;
   a parameter that is different to the predefined parameter and an instantiation level that is the same as the predefined instantiation level; or
   a parameter that is different to the predefined parameter and an instantiation level that is different to the predefined instantiation level.

4. The method as claimed in claim 1, wherein the selection of the alternative virtual resource for allocation is based on any one or more of:
- an indication of one or more alternative characteristics in the received first request to manage a virtual network function;
- an indication of one or more alternative characteristics in a virtual network function descriptor; and
- one or more policies associated with one or more alternative characteristics.

5. The method as claimed in claim 4, wherein the one or more policies result in a priority assigned to one or more alternative characteristics.

6. The method as claimed in claim 4, wherein the selection of the alternative virtual resource for allocation is based on the one or more policies if an indication of one or more alternative characteristics is absent in one or more of the received first request to manage a virtual network function and the virtual network function descriptor.

7. The method as claimed in claim 1, wherein if the selected alternative virtual resource is unavailable for allocation, the method comprises:
- selecting a further alternative virtual resource having one or more further alternative characteristics comprising at least one further alternative characteristic that is different to a corresponding one of the alternative characteristics.

8. The method as claimed in claim 7, wherein if the selected further alternative virtual resource is unavailable for allocation, the method comprises:
- continuing to select further alternative virtual resources for allocation until a selected further alternative virtual resource is available for allocation; or
- continuing to select further alternative virtual resources for allocation until a maximum value of selections is reached.

9. A virtual network function manager arranged to manage a virtual network function, the virtual network function manager comprising processing circuitry configured to:
- receive a first request to manage a virtual network function, wherein the first request comprises an indication of whether to select an alternative virtual resource for allocation if a requested virtual resource is unavailable for allocation;
- transmit a second request for a virtual resource associated with the first request to manage the virtual network function, the requested virtual resource having one or more predefined characteristics; and
- if a response is received that indicates the virtual resource having the one or more predefined characteristics is unavailable for allocation:
  - select an alternative virtual resource for allocation, the alternative virtual resource having one or more alternative characteristics comprising at least one alternative characteristic that is different to a corresponding one of the predefined characteristics.

10. The virtual network function manager as claimed in claim 9, wherein the one or more predefined characteristics comprise any one or more of:
- a predefined parameter defining an infrastructure of a virtualisation environment; and
- a predefined instantiation level defining a level at which software instances are created in the virtualisation environment.

11. The virtual network function manager as claimed in claim 10, wherein the one or more predefined characteristics comprise the predefined parameter and the predefined instantiation level and the one or more alternative characteristics comprise:
- a parameter that is the same as the predefined parameter and an instantiation level that is different to the predefined instantiation level;
- a parameter that is different to the predefined parameter and an instantiation level that is the same as the predefined instantiation level; or
- a parameter that is different to the predefined parameter and an instantiation level that is different to the predefined instantiation level.

12. The virtual network function manager as claimed in claim 9, wherein the processing circuitry is configured to select the alternative virtual resource for allocation based on any one or more of:
- an indication of one or more alternative characteristics in the received first request to manage a virtual network function;
- an indication of one or more alternative characteristics in a virtual network function descriptor; and
- one or more policies associated with one or more alternative characteristics.

13. The virtual network function manager as claimed in claim 9, wherein if the selected alternative virtual resource is unavailable for allocation, the processing circuitry is configured to:
- select a further alternative virtual resource having one or more further alternative characteristics comprising at least one further alternative characteristic that is different to a corresponding one of the alternative characteristics.

14. The virtual network function manager as claimed in claim 13, wherein if the selected further alternative virtual resource is unavailable for allocation, the processing circuitry is configured to:
- continue to select further alternative virtual resources for allocation until a selected further alternative virtual resource is available for allocation; or
- continue to select further alternative virtual resources for allocation until a maximum value of selections is reached.

15. A virtualisation environment comprising:
- a virtual network function manager arranged to manage a virtual network function, the virtual network function manager comprising processing circuitry configured to:
  - receive a first request to manage a virtual network function, wherein the first request comprises an indication of whether to select an alternative virtual resource for allocation if a requested virtual resource is unavailable for allocation;
  - transmit a second request for a virtual resource associated with the first request to manage the virtual network function, the requested virtual resource having one or more predefined characteristics; and
  - if a response is received that indicates the virtual resource having the one or more predefined characteristics is unavailable for allocation:
    - select an alternative virtual resource for allocation, the alternative virtual resource having one or more alternative characteristics comprising at least one alternative characteristic that is different to a corresponding one of the predefined characteristics; and
- wherein the virtualization environment further comprises a network functions virtualisation orchestration comprising processing circuitry configured to transmit the first request to manage the virtual network function.

16. The virtualisation environment as claimed in claim 15, the virtualisation environment further comprising:
   a virtual infrastructure manager comprising processing circuitry configured to transmit the response that indicates the virtual resource having the one or more predefined characteristics is unavailable for allocation.

* * * * *